US008908060B2

United States Patent
Sengoku et al.

(10) Patent No.: US 8,908,060 B2
(45) Date of Patent: Dec. 9, 2014

(54) IMAGING APPARATUS GENERATING EVALUATION VALUES AT A HIGH FRAME RATE AND HAVING A LIVE VIEW FUNCTION OF DISPLAYING A VIDEO SMOOTHLY AT A LOW FRAME RATE

(71) Applicant: Olympus Corporation, Tokyo (JP)

(72) Inventors: Tomoyuki Sengoku, Tokyo (JP); Yoshinobu Tanaka, Tokyo (JP); Takashi Yanada, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 62 days.

(21) Appl. No.: 13/724,791

(22) Filed: Dec. 21, 2012

(65) Prior Publication Data

US 2013/0162873 A1 Jun. 27, 2013

(30) Foreign Application Priority Data

Dec. 27, 2011 (JP) ................................ 2011-286027

(51) Int. Cl.
 *H04N 5/228* (2006.01)
 *H04N 5/335* (2011.01)

(52) U.S. Cl.
 CPC .................................... *H04N 5/335* (2013.01)
 USPC .................................. 348/222.1; 348/231.99

(58) Field of Classification Search
 USPC .............................. 348/222.1, 231.99, 333.01
 See application file for complete search history.

(56) References Cited

U.S. PATENT DOCUMENTS

| 2008/0056613 A1* | 3/2008 | Hatanaka et al. | 382/284 |
| 2012/0086830 A1* | 4/2012 | Ichikawa et al. | 348/223.1 |
| 2012/0113296 A1* | 5/2012 | Kunishige | 348/234 |

FOREIGN PATENT DOCUMENTS

| JP | 2005-039710 A | 2/2005 |
| JP | 2005-252484 A | 9/2005 |
| JP | 2007-336599 A | 12/2007 |

* cited by examiner

*Primary Examiner* — Gevell Selby
(74) *Attorney, Agent, or Firm* — Westerman, Hattori, Daniels & Adrian, LLP

(57) ABSTRACT

An imaging apparatus includes an image data interface unit that outputs first image data according to a pixel signal input from a solid-state imaging device, an image data reading unit that reads image data from a storage unit and outputs the read image data as second image data, an image synthesis unit that outputs third image data obtained by synthesizing the first image data with second image data, an evaluation value generation unit that generates an evaluation value based on image data, a first image data selection unit that inputs selected image data to the evaluation value generation unit, an image data writing unit that stores image data in the storage unit, a second image data selection unit that inputs selected image data to the image data writing unit, and a display unit that displays an image according to the third read image data read from the storage unit.

15 Claims, 11 Drawing Sheets

IMAGING APPARATUS GENERATING EVALUATION VALUES AT A HIGH FRAME RATE AND HAVING A LIVE VIEW FUNCTION OF DISPLAYING A VIDEO SMOOTHLY AT A LOW FRAME RATE

BACKGROUND OF THE INVENTION

1. Field of the Invention

The present invention relates to an imaging apparatus.

Priority is claimed on Japanese Patent Application No. 2011-286027, filed Dec. 27, 2011, the content of which is incorporated herein by references.

2. Description of Related Art

Recently, imaging devices such as a digital camera, include auto focus (AF) functionality. As a method of realizing the AF function in a conventional imaging apparatus, the position of a focus lens is sequentially moved in a certain direction based on a pixel signal output from a solid-state imaging device (hereinafter referred to as an "image sensor"). Thus, a so-called imager AF using hill-climbing control to detect a focusing position on a subject is known. In the imager AF, an AF evaluation value for control of AF is generated based on a pixel signal output from the image sensor in real time, and the position of the focus lens is controlled based on the generated AF evaluation value (see Japanese Unexamined Patent Application, First Publication No. 2005-252484).

FIG. 10 is a block diagram illustrating a schematic configuration of a conventional imaging apparatus. In FIG. 10, the imaging apparatus includes an image sensor, an imaging processing unit, an image processing unit, a DRAM (Dynamic Random Access Memory) controller, a DRAM, a display processing unit, a display device, and a CPU. Also, the imaging processing unit, the image processing unit, the display processing unit, the CPU, and the DRAM controller included in the imaging apparatus are connected to a common data bus, and the respective components perform, via the data bus, data delivery when performing a process. Further, in FIG. 10, a schematic internal configuration of the imaging processing unit is also shown. In FIG. 10, the imaging processing unit includes an imaging IF (interface) unit, a preprocessing unit, an AE evaluation value generation unit, an AWB evaluation value generation unit, an AF evaluation value generation unit, and an output DMA (Direct Memory Access) unit.

In the conventional imaging apparatus illustrated in FIG. 10, the imaging IF unit acquires a pixel signal from the image sensor, and outputs the acquired pixel signal as image data to the preprocessing unit. The preprocessing unit performs various processes on the image data input from the imaging IF unit. In FIG. 10, an example of the preprocessing unit including three processing units that perform the respective processes is illustrated. The preprocessing unit outputs final image data obtained by the respective processing units sequentially performing the processes to the AE evaluation value generation unit, the AWB evaluation value generation unit, the AF evaluation value generation unit, and the output DMA unit.

The output DMA unit stores the image data input from the preprocessing unit in the DRAM via the DRAM controller. Here, the image data stored in the DRAM becomes original image data that is image-processed by the image processing unit later.

Further, the AF evaluation value generation unit generates an AF evaluation value based on the image data input from the preprocessing unit. The AF evaluation value generation unit stores the generated AF evaluation value in the DRAM via the DRAM controller. The CPU performs control of AF in the conventional imaging apparatus, that is, control of a position of a focus lens using the AF evaluation value stored in the DRAM.

Further, the AE evaluation value generation unit and the AWB evaluation value generation unit are evaluation value generation units that generate evaluation values for control of auto exposure (AE), auto white balance (AWB) and the like as photography control other than the AF in the conventional imaging apparatus. The AE evaluation value generation unit and the AWB evaluation value generation unit generate an AE evaluation value and an AWB evaluation value, respectively, based on the image data input from the preprocessing unit, similar to the AF evaluation value generation unit. The AE evaluation value generation unit and the AWB evaluation value generation unit store the generated AE and AWB evaluation values in the DRAM via the DRAM controller. The CPU performs control of AE and AWB in the conventional imaging apparatus using the AE evaluation value and the AWB evaluation value stored in the DRAM.

The AF evaluation value generation unit, the AE evaluation value generation unit, and the AWB evaluation value generation unit may be configured to hold the generated AF, AE, and AWB evaluation values in registers of the respective evaluation values generation units instead of storing the generated AF, AE, and AWB evaluation values in the DRAM, respectively. In the case of such a configuration, after receiving a notification indicating that the generation of the evaluation values is completed from the respective evaluation values generation units, the CPU reads the respective evaluation values held in the registers in the respective evaluation value generation units, and performs control of AF, AE, and AWB in the imaging apparatus using the respective read evaluation values.

With such a configuration, each time the pixel signal is acquired from the image sensor, the conventional imaging apparatus generates the AF evaluation value, the AE evaluation value, and the AWB evaluation value and performs control of photography in the imaging apparatus.

Further, in the conventional imaging apparatus, there is a need for a high-speed AF function, that is, a high focusing speed. Accordingly, in a conventional imaging apparatus with an imager AF, a method of increasing a speed at which a pixel signal is read from the image sensor, that is, increasing a frame rate, is adopted as a method for realizing a high focusing speed. More AF evaluation values, one being obtained each time the pixel signal is acquired from the image sensor, that is, for each captured frame, can be obtained by increasing the frame rate.

However, the pixel signal of each frame acquired from the image sensor is used for cases other than control for photography in the imaging apparatus, of the AF evaluation value or the like. For example, a so-called live view function of displaying a video for confirmation of a subject to be photographed on a display device such as a TFT (thin film transistor) liquid crystal display or an EVF (electronic view finder) mounted on the imaging apparatus is mounted in the conventional imaging apparatus. In this live view function, image data of each frame for display on the display device is generated from the pixel signal of each frame acquired from the image sensor, and the image data of respective frames is sequentially displayed on the display device for each frame.

FIG. 11 is a timing chart illustrating an example of a schematic timing of the image sensor and the display device included in the conventional imaging apparatus. In the following description, in order to discriminate a frame rate of the image sensor from a frame rate of the display device, a frame rate at which a pixel signal is acquired from the image sensor is referred to as an "imaging frame rate," and a frame rate at which the display device displays an image is referred to as a "display frame rate." In FIG. 11, there is a case in which the imaging frame rate of the image sensor is 120 fps (frame/sec), and the display frame rate of the display device is 60 fps. In this case, a timing relationship between a captured image that is image data according to the pixel signal acquired from the image sensor and a display image that is the image data displayed on the display device is illustrated.

In FIG. 11, "vertical synchronization signal of image sensor" is a signal indicating a timing at which acquisition of a pixel signal of each frame from the image sensor starts. "Vertical synchronization signal of display device" is a signal indicating a timing at which the display device starts display of the image of each frame. Further, in FIG. 11, a period of "AF process" is a period in which an AF evaluation value generation unit included in the imaging apparatus generates an AF evaluation value based on a captured image. In FIG. 11, a case in which a timing of "vertical synchronization signal of image sensor" and a timing of "vertical synchronization signal of display device" are synchronized to facilitate a comparison of timing relationships between the captured image and the display image is illustrated.

When the imaging frame rate of the image sensor and the display frame rate of the display device in the conventional imaging apparatus differ from each other, a method of decimating a captured image and displaying a resultant image on the display device is adopted as illustrated in FIG. 11. In FIG. 11, since the display frame rate is half of the imaging frame rate, a captured image decimated in half in units of frames becomes a display image.

Further, for example, technologies such as technologies in Japanese Unexamined Patent Application, First Publication Nos. 2005-39710 and 2007-336599 are disclosed as technologies for displaying a synthesized image. In the technologies disclosed in Japanese Unexamined Patent Application, First Publication Nos. 2005-39710 and 2007-336599, the number of frames of a captured image to be synthesized is changed according to a display frame rate for display on a display device.

SUMMARY OF THE INVENTION

An imaging apparatus according to a first aspect of the present invention includes an image data interface unit that outputs image data according to a pixel signal input from a solid-state imaging device as first image data; an image data reading unit that reads image data stored in a storage unit via a data bus and outputs the read image data as second image data; an image synthesis unit that synthesizes image data based on the first image data with image data based on the second image data to generate and output third image data; an evaluation value generation unit that generates an evaluation value based on input image data; a first image data selection unit that selects any one of the image data based on the first image data, the image data based on the second image data, and the third image data as image data to be input to the evaluation value generation unit; an image data writing unit that stores input image data in the storage unit via the data bus; a second image data selection unit that selects any one of the image data based on the first image data, the image data based on the second image data, and the third image data as image data to be input to the image data writing unit; and a display unit that reads the third image data stored in the storage unit by the image data writing unit, from the storage unit via the data bus and displays an image according to the third read image data.

Further, according to a second aspect of the present invention, in the imaging apparatus according to the first aspect, the image data interface unit sequentially outputs a plurality of first image data according to the pixel signal input from the solid-state imaging device in an unit period in which the display unit updates display of the image. The second image data selection unit selects the image data based on the first image data first output from the image data interface unit after the unit period of the display unit starts, as the image data to be input to the image data writing unit, and then selects the sequentially input third image data as the image data to be input to the image data writing unit until the unit period of the display unit ends. The image data writing unit sequentially stores the third input image data subsequently to the first input image data based on the first image data in the storage unit, and the image data reading unit sequentially reads, as second image data, the third image data stored in the storage unit subsequently to the first image data based on the first image data stored in the storage unit. The image synthesis unit sequentially outputs the third image data obtained by sequentially synthesizing the image data based on the first image data sequentially output from the image data interface unit with the image data based on the second image data read by the image data reading unit. The display unit displays an image according to the third image data lastly synthesized by the image synthesis unit, which is stored in the storage unit, when the unit period of the display unit ends. The first image data selection unit sequentially selects, in the unit period of the display unit, any one of the image data based on the first image data sequentially output from the image data interface unit, the image data based on the second image data sequentially read by the image data reading unit, and the third image data sequentially synthesized by the image synthesis unit, as the image data to be input to the evaluation value generation unit. The evaluation value generation unit sequentially generates the evaluation value based on the sequentially input image data.

Further, according to a third aspect of the present invention, the imaging apparatus according to the second aspect further includes an image reduction unit that is arranged between the second image data selection unit and the image data writing unit, reduces the image data selected by the second image data selection unit to a predetermined size, and outputs the reduced image data as the image data to be input to the image data writing unit.

Further, according to a fourth aspect of the present invention, in the imaging apparatus according to the third aspect, the image reduction unit reduces only image data to be lastly input to the image data writing unit to output the reduced image data to the image data writing unit in the unit period of the display unit.

Further, according to a fifth aspect of the present invention, the imaging apparatus according to the second aspect further includes: a plurality of image reduction units that are arranged between the second image data selection unit and the image data writing unit, reduce the image data selected by the second image data selection unit to a predetermined size, and output the reduced image data as the image data to be input to the image data writing unit. The respective image reduction units reduce the image data selected by the second image data selection unit to predetermined different sizes, and output the respective reduced image data as respective image data to be input to the image data writing unit. The image data writing unit sequentially stores the respective reduced image data input from the respective image reduction units in the storage unit.

Further, according to a sixth aspect of the present invention, the respective image reduction units of the imaging apparatus according to the fifth aspect reduce only image data to be lastly input to the image data writing unit to output the reduced image data to the image data writing unit in the unit period of the display unit.

Further, according to a seventh aspect of the present invention, the imaging apparatus according to the second aspect further includes: an image reduction unit that is arranged between the second image data selection unit and the image data writing unit, reduces the image data selected by the second image data selection unit to a predetermined size, and outputs the reduced image data as the image data to be input to the image data writing unit; and an image magnification unit that is arranged in a subsequent stage of the image data reading unit, magnifies the second image data read by the image data reading unit to the same size as the first image data output by the image data interface unit, and outputs the magnified image data as the second image data.

Further, according to an eighth aspect of the present invention, in the imaging apparatus according to the seventh aspect, the image reduction unit reduces all image data to be input to the image data writing unit to output the reduced image data to the image data writing unit in the unit period of the display unit. The image magnification unit magnifies all the second image data read by the image data reading unit to output the magnified image data as the second image data in the unit period of the display unit.

Further, according to a ninth aspect of the present invention, the imaging apparatus according to any one of the second to eighth aspects further includes: a first preprocessing unit that performs a predetermined process on input image data; and a second preprocessing unit that performs a predetermined process on input image data. The first preprocessing unit outputs image data obtained by performing the predetermined process on any one of the first input image data and the second input image data, as fourth image data. The second preprocessing unit outputs image data obtained by performing the predetermined process on the other of the first input image data and the second input image data, as fifth image data. The first image data selection unit selects any one of the third image data, the fourth image data and the fifth image data, as the image data to be input to the evaluation value generation unit. The second image data selection unit selects any one of the third image data, the fourth image data and the fifth image data, as the image data to be input to the image data writing unit.

Further, according to a tenth aspect of the present invention, in the imaging apparatus of the ninth aspect, the first preprocessing unit is at least one processing unit that performs a predetermined correction process on input image data. The second preprocessing unit is at least one delay unit that performs a process of delaying input image data by a predetermined time and outputting the delayed image data.

Further, according to an eleventh aspect of the present invention, the predetermined time in the imaging apparatus of the tenth aspect is the same time as a delay time from a time when the image data is input to the first preprocessing unit to a time when the image data is subjected to the predetermined correction process and output.

Further, according to a twelfth aspect of the present invention, in the imaging apparatus according to the ninth aspect, the first preprocessing unit is at least one first processing unit that performs a predetermined correction process on the input image data. The second preprocessing unit is at least one second processing unit that performs a predetermined correction process on the input image data.

Further, according to a thirteenth aspect of the present invention, in the imaging apparatus of the eleventh or twelfth aspect, when the evaluation value generation unit generates the evaluation value based on the image data according to the pixel signal input from the solid-state imaging device, the first image data selection unit selects any one of the fourth image data and the fifth image data based on the first image data, as the image data to be input to the evaluation value generation unit. When the evaluation value generation unit generates the evaluation value based on the image data stored in the storage unit, the first image data selection unit selects any one of the fourth image data and the fifth image data based on the second image data, as the image data to be input to the evaluation value generation unit. When the evaluation value generation unit generates the evaluation value based on the third image data, the first image data selection unit selects the third image data as the image data to be input to the evaluation value generation unit.

Further, according to a fourteenth aspect of the present invention, in the imaging apparatus according to the thirteenth aspect, the imaging apparatus includes: a plurality of evaluation value generation units; and a plurality of first image data selection units corresponding to the plurality of evaluation value generation units, respectively. Each first image data selection unit selects any one of the third image data, the fourth image data based on any one of the first image data and the second image data, and the fifth image data based on any one of the first image data and the second image data, which is used when the corresponding evaluation value generation unit generates the evaluation value, as image data to be input to the corresponding evaluation value generation unit.

Further, according to a fifteenth aspect of the present invention, in the imaging apparatus according to the fourteenth aspect, at least one first image data selection unit selects any one of the fourth image data and the fifth image data based on any one of the first image data and the second image data, which is used when the corresponding evaluation value generation unit generates the evaluation value, as image data to be input to the corresponding evaluation value generation unit. At least the other first image data selection unit selects the third image data or the other of the fourth image data and the fifth image data based on the other of the first image data and the second image data, which is used when the corresponding evaluation value generation unit generates the evaluation value, as the image data to be input to the corresponding evaluation value generation unit.

DETAILED DESCRIPTION OF THE INVENTION

First Embodiment

Figure 1:
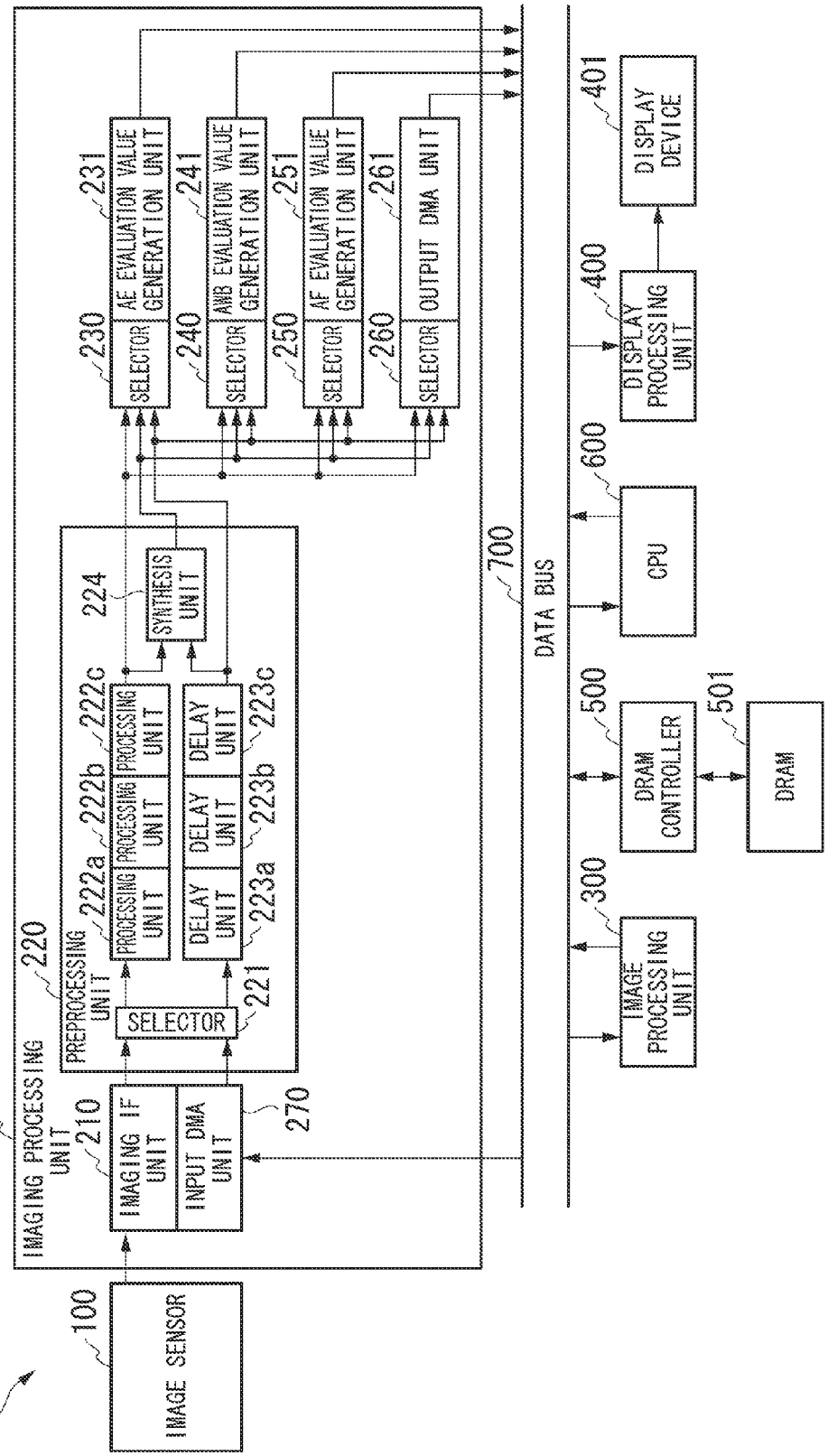
FIG. 1 is a block diagram illustrating a schematic configuration of an imaging apparatus in a first embodiment of the present invention.

Hereinafter, embodiments of the present invention will be described with reference to the accompanying drawings. FIG. 1 is a block diagram illustrating a schematic configuration of an imaging apparatus in a first embodiment. An imaging apparatus 10 illustrated in FIG. 1 includes an image sensor 100, an imaging processing unit 200, an image processing unit 300, a display processing unit 400, a display device 401, a DRAM (Dynamic Random Access Memory) controller 500, a DRAM 501, and a CPU 600.

The imaging processing unit 200, the image processing unit 300, the display processing unit 400, the DRAM controller 500, and the CPU 600 in the imaging apparatus 10 are connected via a data bus 700. For example, reading of data from the DRAM 501 connected to the DRAM controller 500 and writing of data to the DRAM 501 are performed by DMA (Direct Memory Access).

Figure 10:
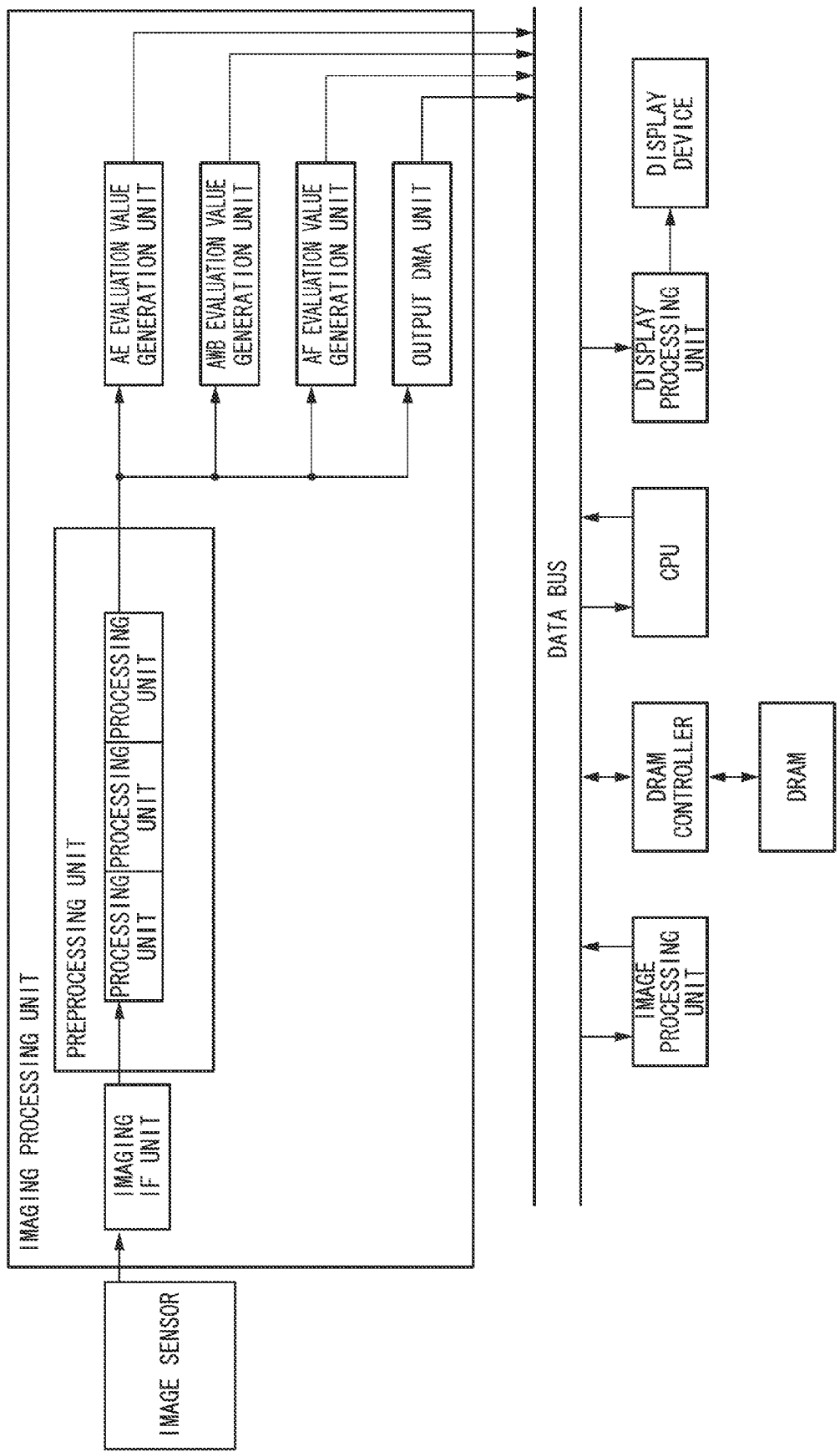
FIG. 10 is a block diagram illustrating a schematic configuration of a conventional imaging apparatus.

The imaging apparatus 10 illustrated in FIG. 1 includes the same components as a conventional imaging apparatus illustrated in FIG. 10. However, a configuration of the imaging processing unit 200 in the imaging apparatus 10 differs from that of an imaging processing unit included in the conventional imaging apparatus. In FIG. 1, a schematic configuration of the imaging processing unit 200 is also shown, focusing on the imaging processing unit 200 having a different configuration from the conventional imaging apparatus.

The imaging processing unit 200 in the imaging apparatus 10 includes an imaging IF (interface) unit 210, a preprocessing unit 220, a selector 230, an AE evaluation value generation unit 231, a selector 240, an AWB evaluation value generation unit 241, a selector 250, an AF evaluation value generation unit 251, a selector 260, an output DMA (Direct Memory Access) unit 261, and an input DMA unit 270.

The image sensor 100 includes, as a representative image sensor, a CCD (Charge Coupled Device) image sensor or a CMOS (Complementary Metal-Oxide Semiconductor) image sensor that performs photoelectric conversion on an optical image of a subject formed by a zoom lens, which is not shown.

In the image sensor 100, for example, color filters in a Bayer array are attached to an imaging surface. The image sensor 100 outputs a pixel signal of each color (e.g., R, Gr, Gb, B) according to the subject light to the imaging processing unit 200. Since a configuration or an operation of the image sensor 100 is the same as, for example, that of an image sensor included in the conventional imaging apparatus illustrated in FIG. 10, a detailed description thereof will be omitted here.

The imaging processing unit 200 performs various processes on the pixel signal input from the image sensor 100 to generate an evaluation value for control for photography in the imaging apparatus 10 (control of AE, AWB, and AF). Further, the imaging processing unit 200 stores image data according to the pixel signal input from the image sensor 100 (hereinafter referred to also as a "captured image") in the DRAM 501 via the DRAM controller 500.

Further, the imaging processing unit 200 acquires (reads) the image data (captured image) stored in the DRAM 501 via the DRAM controller 500. Based on the acquired image data, the imaging processing unit 200 generates the evaluation value for control for photography in the imaging apparatus 10 (control of AE, AWB, and AF).

Further, the imaging processing unit 200 synthesizes image data according to the pixel signal input from the image sensor 100 (a captured image of a current frame) with the image data acquired (read) via the DRAM controller 500 (a captured image of a previous frame). Based on the synthesized image data, the imaging processing unit 200 generates the evaluation value for control for photography in the imaging apparatus 10 (control of AE, AWB, and AF). Further, the imaging processing unit 200 stores the synthesized image data in the DRAM 501 via the DRAM controller 500.

The imaging IF unit 210 acquires the pixel signal input from the image sensor 100, and outputs the acquired pixel signal as the image data (the captured image of the current frame) to the preprocessing unit 220. When the imaging IF unit 210 outputs the image data to the preprocessing unit 220, the imaging IF unit 210 performs, for example, a sorting process to sort the data of the pixel signals of respective colors input from the image sensor 100 in order of colors of pixels used in a subsequent process. Further, when the image sensor 100 is an image sensor that outputs the pixel signal via a differential interface, the imaging IF unit 210 performs, for example, a process of termination for LVDS (Low Voltage Differential Signaling). Since the configuration or the operation of the imaging IF unit 210 is the same as, for example, that of an imaging IF unit included in the conventional imaging apparatus illustrated in FIG. 10, a detailed description thereof will be omitted here.

The preprocessing unit 220 performs various preprocessing such as defect correction or shading correction on the image data input from the imaging IF unit 210, and outputs image data as a processing result (hereinafter referred to as "preprocessed image data") to each of the selector 230, the selector 240, the selector 250, and the selector 260.

Further, the preprocessing unit 220 outputs image data obtained by delaying image data input from the input DMA unit 270 by a predetermined time (hereinafter referred to as "delayed image data") to each of the selector 230, the selector 240, the selector 250, and the selector 260.

Further, the preprocessing unit 220 synthesizes the preprocessed image data with the delayed image data. The preprocessing unit 220 outputs the synthesized image data (hereinafter referred to as "synthesis image data") to each of the selector 230, the selector 240, the selector 250, and the selector 260.

As illustrated in FIG. 1, the preprocessing unit 220 includes a selector 221, three processing units 222a to 222c, three delay units 223a to 223c, and a synthesis unit 224.

In FIG. 1, an example of the preprocessing unit 220 including the three processing units 222a to 222c that sequentially perform respective processes, similar to a preprocessing unit included in the conventional imaging apparatus illustrated in FIG. 10, is illustrated.

The selector 221 selects an output destination of the image data input from the imaging IF unit 210 (the captured image of the current frame) and the image data input from the input DMA unit 270 (the captured image of the previous frame). More specifically, the selector 221 outputs the image data input from the imaging IF unit 210 to any one of the processing unit 222a and the delay unit 223a. Further, the selector 221 outputs the image data input from the input DMA unit 270 to any one of the processing unit 222a and the delay unit 223a.

Each of the processing units 222a to 222c performs a predetermined process (correction process) on the input image data. For example, the processing unit 222a performs a defect correction process on the input image data. Further, for example, the processing unit 222b performs a shading correction process on the image data subjected to the defect correction process, which is input from the processing unit 222a.

Thus, the respective processing units 222a to 222c sequentially perform the predetermined processes (correction processes) on the input image data. Also, the image data after the process (correction process) in the processing unit 222c is output as preprocessed image data to each of the selector 230, the selector 240, the selector 250, and the selector 260. Further, the preprocessed image data is also output to the synthesis unit 224. Since the configuration or the operation of each of the processing units 222a to 222c is the same as, for example, that of each of three processing units included in the conventional imaging apparatus illustrated in FIG. 10, a detailed description thereof will be omitted here.

Each of the delay units 223a to 223c corresponds to one of the processing units 222a to 222c, delays the input image data by the same time as a delay time from an input of each of the processing units 222a to 222c to an output thereof, and outputs the delayed image data. For example, the delay unit 223a delays the input image data by the same time as a delay time (process time) due to the defect correction process of the processing unit 222a, and outputs the delayed image data. Further, for example, the delay unit 223b delays the image data delayed by the delay unit 223a by the same time as a delay time (process time) due to the shading correction process of the processing unit 222b, and outputs the delayed image data.

Thus, the respective delay units 223a to 223c sequentially delay the input image data by the same time as the delay time (process time) of the corresponding processing unit, and output the delayed image data. Also, the delayed image data that the delay unit 223c delayed is output as delayed image data to each of the selector 230, the selector 240, the selector 250, and the selector 260. Further, the delayed image data is also output to the synthesis unit 224.

The synthesis unit 224 generates synthesis image data obtained by synthesizing the input preprocessed image data with the delayed image data. When the synthesis unit 224 generates the synthesis image data, the synthesis unit 224 performs, for example, a synthesis process such as an addition process, a subtraction process, a weighting and addition process, and an addition and averaging process on the input preprocessed image data and the delayed image data and generates the synthesis image data. Also, the synthesis unit 224 outputs the generated synthesis image data to each of the selector 230, the selector 240, the selector 250, and the selector 260.

The selector 230 selects any one of the preprocessed image data input from the preprocessing unit 220, the delayed image data, and the synthesis image data. The selector 230 outputs the selected image data as image data for generation of an AE evaluation value to the AE evaluation value generation unit 231.

The AE evaluation value generation unit 231 calculates (generates) an AE evaluation value for control of exposure of the imaging apparatus 10 based on the image data input from the selector 230. When the image sensor 100 is an image sensor with the Bayer array, the AE evaluation value generation unit 231 generates each AE evaluation value by integrating the image data input from the selector 230 for each color (R, Gr, Gb, B). Also, the AE evaluation value generation unit 231 stores the generated AE evaluation value in the DRAM 501 via the DRAM controller 500. Since the configuration or the operation of the AE evaluation value generation unit 231 is the same as, for example, that of an AE evaluation value generation unit included in the conventional imaging apparatus illustrated in FIG. 10, a detailed description thereof will be omitted here.

The AE evaluation value generation unit 231 may be configured to hold the generated AE evaluation value in a register in the AE evaluation value generation unit 231, instead of storing the generated AE evaluation value in the DRAM 501. In this case, after receiving a notification indicating that the generation of the AE evaluation value is completed from the AE evaluation value generation unit 231, the CPU 600 reads the AE evaluation value held in the register in the AE evaluation value generation unit 231. Using the read AE evaluation value, the CPU 600 performs control of AE in the imaging apparatus 10.

The selector 240 selects any one of the preprocessed image data input from the preprocessing unit 220, the delayed image data, and the synthesis image data, and outputs the selected image data as image data for generation of an AWB evaluation value to the AWB evaluation value generation unit 241.

The AWB evaluation value generation unit 241 calculates (generates) an AWB evaluation value for control of white balance of the imaging apparatus 10 based on the image data input from the selector 240. When the image sensor 100 is an image sensor with the Bayer array, the AWB evaluation value generation unit 241 generates an AWB evaluation value for adjustment of a white level from image data of each color (R, Gr, Gb, B) input from the selector 240. Also, the AWB evaluation value generation unit 241 stores the generated AWB evaluation value in the DRAM 501 via the DRAM controller 500. Since the configuration or the operation of the AWB evaluation value generation unit 241 is the same as, for example, that of an AWB evaluation value generation unit included in the conventional imaging apparatus illustrated in FIG. 10, a detailed description thereof will be omitted here.

The AWB evaluation value generation unit 241 may be configured to hold the generated AWB evaluation value in a register in the AWB evaluation value generation unit 241, instead of storing the generated AWB evaluation value in the DRAM 501. In this case, after receiving a notification indicating that the generation of the AWB evaluation value is completed from the AWB evaluation value generation unit 241, the CPU 600 reads the AWB evaluation value held in the register in the AWB evaluation value generation unit 241, and performs control of AWB in the imaging apparatus 10 using the read AWB evaluation value.

The selector 250 selects any one of the preprocessed image data, the delayed image data, and the synthesis image data input from the preprocessing unit 220. The selector 250 outputs the selected image data as image data for generation of an AF evaluation value to the AF evaluation value generation unit 251.

The AF evaluation value generation unit 251 calculates (generates) an AF evaluation value for control of focus of the imaging apparatus 10 based on the image data input from the selector 250. When the image sensor 100 is an image sensor with the Bayer array, the AF evaluation value generation unit 251 generates a luminance signal (Y signal) from image data of each color (R, Gr, Gb, B) input from the selector 250, and generates an AF evaluation value based on the generated Y signal. Also, the AF evaluation value generation unit 251 stores the generated AF evaluation value in the DRAM 501 via the DRAM controller 500. Since the configuration or the operation of the AF evaluation value generation unit 251 is the same as, for example, that of an AF evaluation value generation unit included in the conventional imaging apparatus illustrated in FIG. 10, a detailed description thereof will be omitted here.

The AF evaluation value generation unit 251 may be configured to hold the generated AF evaluation value in a register in the AF evaluation value generation unit 251, instead of storing the generated AF evaluation value in the DRAM 501. In this case, after receiving a notification indicating that the generation of the AF evaluation value is completed from the AF evaluation value generation unit 251, the CPU 600 reads the AF evaluation value held in the register in the AF evaluation value generation unit 251. Using the read AF evaluation value, the AF evaluation value generation unit 251 performs control of AF in the imaging apparatus 10.

The selector 260 selects any one of the preprocessed image data, the delayed image data, and the synthesis image data input from the preprocessing unit 220. The selector 260 outputs the selected image data as original image data to be processed by the image processing unit 300 or the display processing unit 400 to the output DMA unit 261.

The output DMA unit 261 stores the image data input from the selector 260 in the DRAM 501 via the DRAM controller 500 through DMA. When the image sensor 100 is an image sensor with the Bayer array, image data of the Bayer array is stored as image data (Bayer data) to be processed by the image processing unit 300 or the display processing unit 400 in the DRAM 501. Since the configuration or the operation of the output DMA unit 261 is the same as, for example, that of an output DMA unit included in the conventional imaging apparatus illustrated in FIG. 10, a detailed description thereof will be omitted here.

The input DMA unit 270 acquires (reads) the image data (the captured image of the previous frame) stored in the DRAM 501 via the DRAM controller 500 through DMA. The input DMA unit 270 outputs the acquired image data to the preprocessing unit 220. The image data acquired by the input DMA unit 270 may be the image data stored by the output DMA unit 261, as well as, for example, the image data image-processed by the image processing unit 300 and then stored in the DRAM 501.

The image processing unit 300 acquires (reads) the image data stored in the DRAM 501. The image processing unit 300 performs various image processing such as noise removal, a YC conversion process, a resizing process, a JPEG compression process, and a video compression process such as an MPEG compression process or an H.264 compression process on the acquired image data to generate image data for recording. Also, the image processing unit 300 stores (writes) the generated image data for recording in the DRAM 501 again.

Further, the image processing unit 300 acquires (reads) the image data for recording stored in the DRAM 501. The image processing unit 300 generates image data obtained by performing various image processing, such as a video decompression process such as a JPEG decompression process, an MPEG decompression process or an H.264 decompression process. Also, the image processing unit 300 stores (writes) the generated image data in the DRAM 501 again. Since the configuration or the operation of the image processing unit 300 is the same as, for example, that of an image processing unit included in the conventional imaging apparatus illustrated in FIG. 10, a detailed description thereof will be omitted here.

The display processing unit 400 acquires (reads) the image data stored in the DRAM 501. The display processing unit 400 performs a display process, such as image processing for display to resize (reduce) a size of an image that is able to be displayed by the display device 401 or a process of superimposing OSD (On-Screen Display) display data, on the acquired image data to generate image data for display (hereinafter referred to as a "display image"). Also, the display processing unit 400 outputs the generated image data for display (display image) to the display device 401 or an external display, which is not shown. Since the configuration or the operation of the display processing unit 400 is the same as, for example, that of a display processing unit included in the conventional imaging apparatus illustrated in FIG. 10, a detailed description thereof will be omitted here.

The display processing unit 400 may be configured to perform a display process such as the process of superimposing OSD display data. In this case, for example, the image processing unit 300 performs the image processing for display on the image data or the image data for recording acquired (read) from the DRAM 501 to generate image data for display. The image processing unit 300 stores (writes) the generated image data for display in the DRAM 501 again. Also, the display processing unit 400 acquires (reads) the image data for display stored in the DRAM 501. The display processing unit 400 performs the display process such as the process of superimposing OSD display data, on the acquired image data for display.

The display device 401 is a display device such as a TFT (thin film transistor) liquid crystal display (LCD) or an organic EL (Electro Luminescence) display. The display device 401 displays an image according to the image data for display (display image) output from the display processing unit 400. Since the display device 401 is the same as, for example, the display device included in the conventional imaging apparatus illustrated in FIG. 10, a detailed description thereof will be omitted here.

The DRAM controller 500 performs control of storing (writing) of data in the connected DRAM 501 and acquiring (reading) of data from the DRAM 501 in response to a request for access to the DRAM 501 from a plurality of components in the imaging apparatus 10 connected to the data bus 700, for example, a DMA access request. Since the configuration or the operation of the DRAM controller 500 is the same as, for example, that of a DRAM controller included in the conventional imaging apparatus illustrated in FIG. 10, a detailed description thereof will be omitted here.

The DRAM 501 is a memory that is access-controlled by the DRAM controller 500. The DRAM 501 records various data in the processes of the respective components in the imaging apparatus 10. Since the DRAM 501 is the same as, for example, the DRAM included in the conventional imaging apparatus illustrated in FIG. 10, a detailed description thereof will be omitted here.

The CPU 600 controls the components of the imaging apparatus 10, that is, the entire imaging apparatus 10. For example, the CPU 600 controls operation of each component in the imaging apparatus 10 according to a photography operation or a reproduction operation in the imaging apparatus 10. For example, when the imaging apparatus 10 performs the photography operation, the CPU 600 controls start of output of the pixel signal from the image sensor 100 and start of acquisition of the pixel signal by the imaging IF unit 210.

Further, the CPU 600 performs setting or control of the processing units 222a to 222c in the preprocessing unit 220, setting or control of the AE evaluation value generation unit 231, the AWB evaluation value generation unit 241, and the AF evaluation value generation unit 251, or setting of the output DMA unit 261 and the input DMA unit 270. Further, the CPU 600 controls selection of the image data by the selector 221, the selector 230, the selector 240, the selector 250, and the selector 260 in the preprocessing unit 220.

Figure 2A:
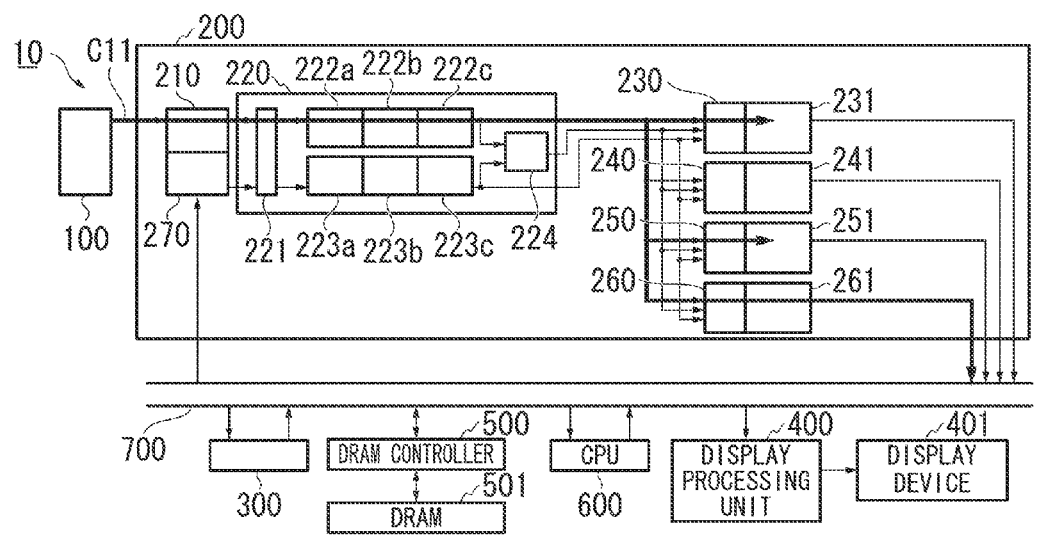
FIG. 2A is a diagram schematically illustrating an example of an operation of evaluation value generation and image display in the imaging apparatus of the first embodiment.
Figure 2B:
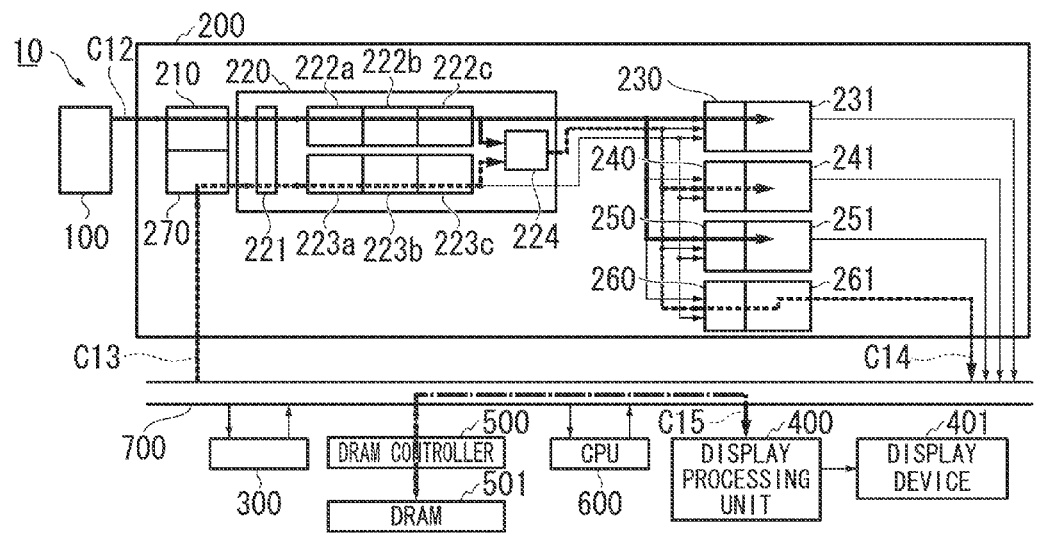
FIG. 2B is a diagram schematically illustrating an example of an operation of the evaluation value generation and the image display in the imaging apparatus of the first embodiment.

Next, an example of an operation of the imaging apparatus 10 of the present embodiment will be described. FIGS. 2A and 2B are a diagram schematically illustrating an example of an operation of evaluation value generation and image display in the imaging apparatus 10 of the first embodiment. The imaging apparatus 10 sequentially displays a captured image according to the pixel signal output from the image sensor 100 on the display device 401 while generating the AE evaluation value, the AWB evaluation value, and the AF evaluation value for control of AE, AWB, and AF for photography. In FIGS. 2A and 2B, paths of data in an evaluation value generation operation and an image display operation are shown on a block diagram of the imaging apparatus 10 illustrated in FIG. 1.

Hereinafter, respective process procedures of the evaluation value generation operation and the image display operation in the imaging apparatus 10 will be described in order.

(Procedure 1): First, in procedure 1, the CPU 600 controls the selector 221, the selector 230, the selector 240, the selector 250, and the selector 260 to select, for example, a path C11 illustrated in FIG. 2A as a data path. Also, the imaging apparatus 10 preprocesses the image data according to the pixel signal output from the image sensor 100. The imaging apparatus 10 generates the evaluation value based on the resultant preprocessed image data (Bayer data). Further, the imaging apparatus 10 stores the preprocessed image data (Bayer data) in the DRAM 501 via the DRAM controller 500.

More specifically, the pixel signal output from the image sensor 100 is input to the imaging processing unit 200. The imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222a, and the respective processing units 222a to 222c sequentially perform preprocessing (correction process) on the input image data.

The preprocessing unit 220 outputs the preprocessed image data after the preprocessing (correction process) in the processing unit 222c to each of the selector 230, the selector 250, and the selector 260. Also, the selector 230, the selector 250, and the selector 260 output the preprocessed image data input from the preprocessing unit 220 to the AE evaluation value generation unit 231, the AF evaluation value generation unit 251, and the output DMA unit 261 corresponding thereto, respectively.

The AE evaluation value generation unit 231 and the AF evaluation value generation unit 251 store an AE evaluation value and an AF evaluation value calculated (generated) based on the preprocessed image data input from the preprocessing unit 220 in the DRAM 501 via the DRAM controller 500. Further, the output DMA unit 261 stores the preprocessed image data (Bayer data) input from the preprocessing unit 220 in the DRAM 501 via the DRAM controller 500 as a captured image of a first frame.

(Procedure 2): Subsequently, in procedure 2, the CPU 600 controls the selector 221, the selector 230, the selector 240, the selector 250, and the selector 260 to select, for example, paths C12, C13, and C14 illustrated in FIG. 2B as respective data paths. Also, the imaging apparatus 10 preprocesses the image data according to the pixel signal output from the image sensor 100, and generates an evaluation value based on the resultant preprocessed image data (Bayer data), as in procedure 1.

Further, simultaneously, the imaging apparatus 10 acquires (reads) the captured image of the first frame stored in the DRAM 501. The imaging apparatus 10 synthesizes image data of the acquired captured image of the first frame with the resultant preprocessed image data (Bayer data). Based on the synthesized image data (Bayer data), the imaging apparatus 10 generates the evaluation value. Further, the imaging apparatus 10 stores the synthesized image data (Bayer data) in the DRAM 501 via the DRAM controller 500.

More specifically, the pixel signal output from the image sensor 100 is input to the imaging processing unit 200. The imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222a. The respective processing units 222a to 222c sequentially perform preprocessing (correction process) on the input image data, and output the resultant image data to the synthesis unit 224. Further, the preprocessing unit 220 outputs the image data preprocessed (correction-processed) by the processing unit 222c to the AE evaluation value generation unit 231 via the selector 230 and to the AF evaluation value generation unit 251 via the selector 250 (see a path C12).

Further, simultaneously, the input DMA unit 270 in the imaging processing unit 200 acquires (reads) the captured image of the first frame stored in the DRAM 501 via the DRAM controller 500. The input DMA unit 270 outputs image data of the acquired captured image of the first frame to the preprocessing unit 220. Also, the selector 221 in the preprocessing unit 220 sends the image data of the captured image of the first frame input from the input DMA unit 270 to the delay unit 223a, and each of the delay units 223a to 223c delays the input image data of the captured image of the first frame by a predetermined time and outputs the resultant image data to the synthesis unit 224 (see a path C13).

Also, the synthesis unit 224 generates synthesis image data by synthesizing the image data preprocessed (correction processed) by the processing unit 222c, that is, a captured image of a second frame with the delayed image data from the delay unit 223c, that is, the captured image of the first frame. Also, the preprocessing unit 220 outputs the synthesis image data generated by the synthesis unit 224 to the AWB evaluation value generation unit 241 via the selector 240 and to the output DMA unit 261 via the selector 260. Also, the output DMA unit 261 stores the synthesis image data (Bayer data) input from the preprocessing unit 220 in the DRAM 501 via the DRAM controller 500 (see a path C14).

Further, the AE evaluation value generation unit 231 and the AF evaluation value generation unit 251 store an AE evaluation value and an AF evaluation value calculated (generated) based on the preprocessed image data (the captured image of the second frame) input from the preprocessing unit 220 in the DRAM 501 via the DRAM controller 500. Further, the AWB evaluation value generation unit 241 calculates (generates) an AWB evaluation value based on the synthesis image data input from the preprocessing unit 220. The AWB evaluation value generation unit 241 stores the generated AWB evaluation value in the DRAM 501 via the DRAM controller 500.

Then, the imaging apparatus 10 displays a display image according to the synthesis image data (Bayer data) stored in the DRAM 501 on the display device 401. In this case, for example, data is input to the display processing unit 400 along the path C15 illustrated in FIG. 2B.

More specifically, the display processing unit 400 acquires (reads) the synthesis image data stored in the DRAM 501 via the DRAM controller 500. The display processing unit 400 performs a display process on the acquired synthesis image data to generate image data for display (display image). Also, the display processing unit 400 outputs the generated display image to the display device 401. Accordingly, the display image (synthesis image data) is displayed on the display device 401.

Then, the imaging apparatus 10 repeats the calculation (generation) of the AE evaluation value and the AF evaluation value based on the captured image of the first frame (the preprocessed image data) and the storage of the captured image of the first frame (Bayer data) in the DRAM 501 in procedure 1, and the calculation (generation) of the AE evaluation value and the AF evaluation value based on the captured image of the second frame (the preprocessed image data), the generation of the synthesis image data, the calculation (generation) of the AWB evaluation value based on the synthesis image data, and the storage of the synthesis image data (Bayer data) in the DRAM 501 in procedure 2. Further, the display processing unit 400 repeats the generation of the display image and output of the display image to the display device 401 in procedure 2.

Thus, in the imaging apparatus 10, the CPU 600 selects the path for processing the image data, as illustrated in FIGS. 2A and 2B, in each process procedure using the selector 221, the selector 230, the selector 240, the selector 250, and the selector 260. Accordingly, the imaging apparatus 10 can sequentially display the display image according to the pixel signal from the image sensor 100 on the display device 401 while generating the respective evaluation values for photography control (control of AE, AWB, and AF) based on the image data according to the pixel signal from the image sensor 100.

In this case, the display image displayed on the display device 401 is an image according to the synthesis image data obtained by synthesizing the captured image of the first frame with the captured image of the second frame. Accordingly, even when the frame rate of the image data for generation of the evaluation value using the pixel signal input from the image sensor 100 (hereinafter referred to as an "imaging frame rate") and the frame rate at which the synthesis image data is displayed on the display device 401 (hereinafter referred to as a "display frame rate") are different frame rates, it is possible to obtain more evaluation values at the imaging frame rate and to display a smooth video from which a subject to be photographed can be easily confirmed at the display frame rate.

While the example in which the AWB evaluation value generation unit 241 does not generate the evaluation value in procedure 1 in the example of the operation of the evaluation value generation and the image display in the imaging apparatus 10 illustrated in FIGS. 2A and 2B has been described, the AE evaluation value generation unit 231, the AWB evaluation value generation unit 241, and the AF evaluation value generation unit 251 may generate the respective evaluation values in procedure 1. That is, the AE evaluation value, the AWB evaluation value, and the AF evaluation value may be generated from the captured image of the current frame that is the preprocessed image data according to the pixel signal from the image sensor 100, and the synthesis image data may be used as the image data for display on the display device 401.

Figure 3:
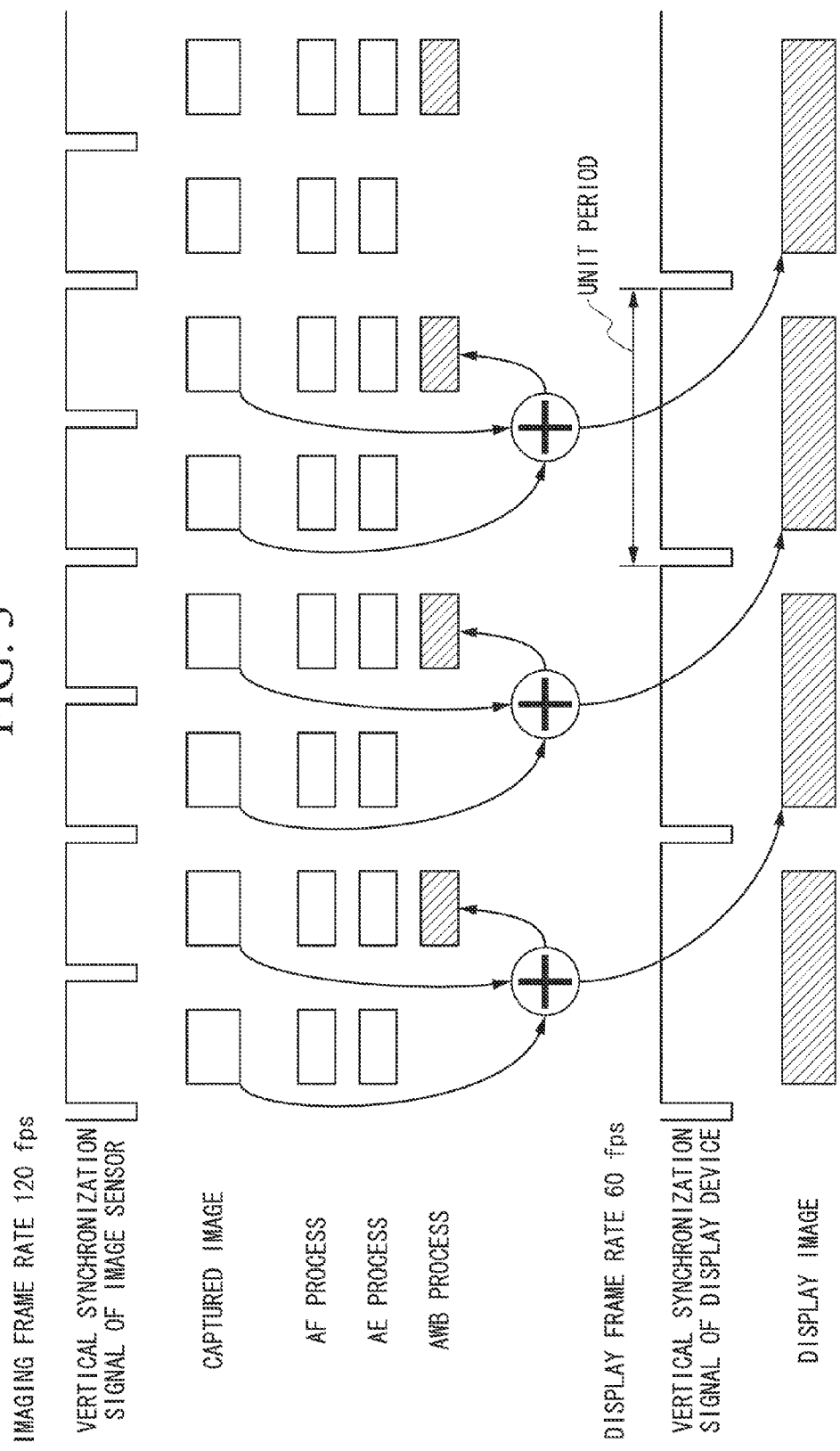
FIG. 3 is a timing chart illustrating an example of a schematic timing of an image sensor and a display device included in the imaging apparatus of the first embodiment.
Figure 11:
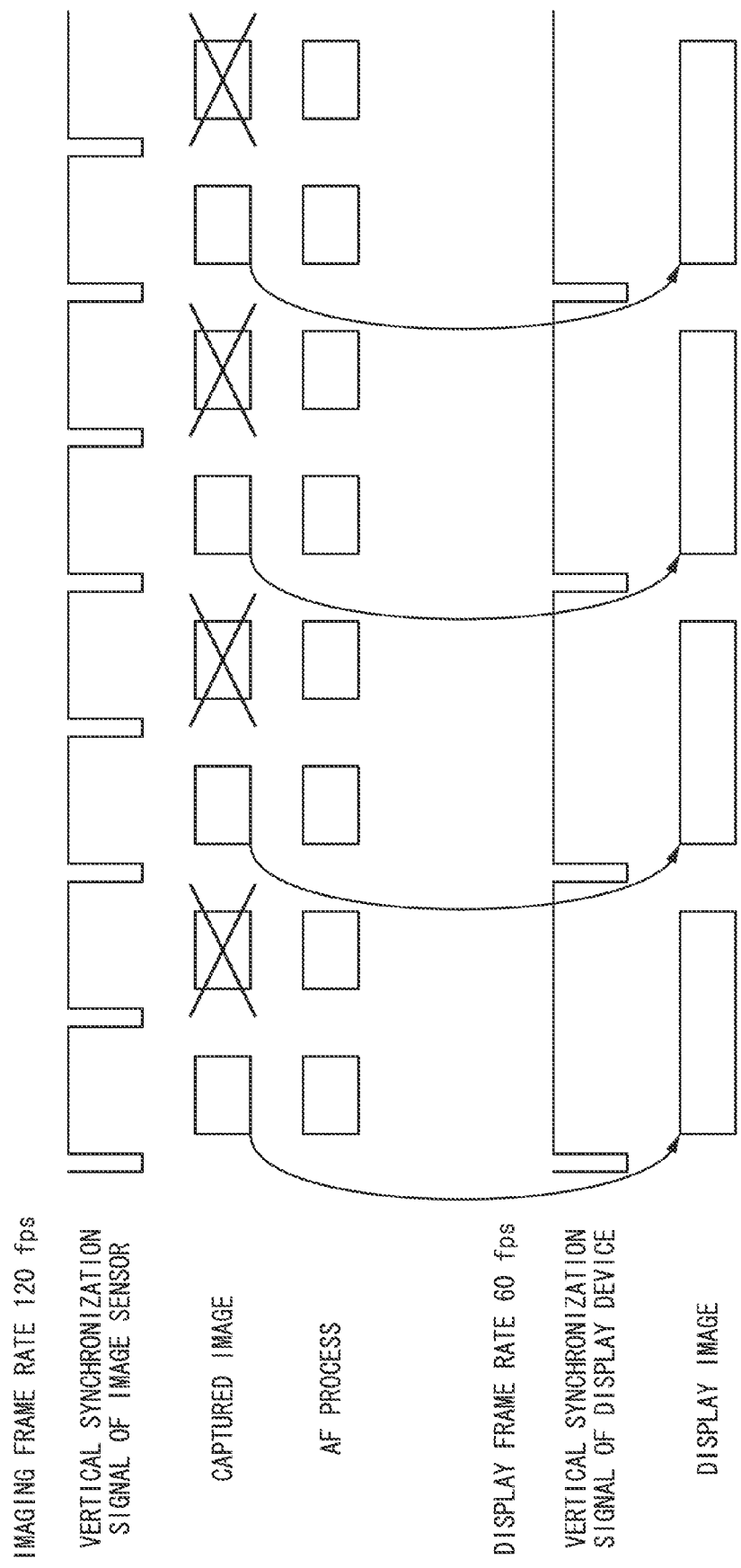
FIG. 11 is a timing chart illustrating an example of a schematic timing of an image sensor and a display device included in the conventional imaging apparatus.

A timing relationship in the example of the operation of the evaluation value generation and the image display in the imaging apparatus 10 illustrated in FIGS. 2A and 2B will be described herein. FIG. 3 is a timing chart illustrating an example of a schematic timing of the image sensor 100 and the display device 401 included in the imaging apparatus 10 of the first embodiment. FIG. 3 illustrates a timing relationship between the captured image that is the image data according to the pixel signal acquired from the image sensor 100 and the display image that is the image data displayed on the display device 401 when the imaging frame rate of the image sensor 100 is 120 fps (frame/sec) and the display frame rate of the display device 401 is 60 fps, similar to the timing in the conventional imaging apparatus illustrated in FIG. 11.

In FIG. 3, "vertical synchronization signal of the image sensor" is a signal indicating a timing to start acquisition of a pixel signal of each frame from the image sensor 100. "Vertical synchronization signal of the display device" is a signal indicating a timing at which the display device 401 starts display of an image of each frame. The display device 401 updates the display image to be displayed each time "the vertical synchronization signal of the display device" is input (in every unit period illustrated in FIG. 3). Further, in FIG. 3, periods of "an AF process," "an AE process," and "an AWB process" are periods in which the AE evaluation value generation unit 231, the AF evaluation value generation unit 251, and the AWB evaluation value generation unit 241 generate an AE evaluation value, an AF evaluation value, and an AWB evaluation value based on the captured image, respectively. In FIG. 3, a case in which the timing of "the vertical synchronization signal of the image sensor" and the timing of "the vertical synchronization signal of the display device" are synchronized for easy comparison of timing relationships between the captured image and the display image is illustrated.

As illustrated in FIG. 3, the synthesis unit 224 included in the imaging apparatus 10 generates the synthesis image data by synthesizing a captured image of an odd-numbered frame with a captured image of an even-numbered frame according to procedure 2. Also, the generated synthesis image data is displayed as a display image on the display device 401. Thus, in the imaging apparatus 10, it is possible to display the image on the display device 401 at the display frame rate (60 fps) without decimating the captured image of each frame obtained from the image sensor 100, that is, without reducing information of the image. Accordingly, the imaging apparatus 10 can display an excellent display image on the display device 401.

Further, as illustrated in FIG. 3, the AE evaluation value generation unit 231 and the AF evaluation value generation unit 251 included in the imaging apparatus 10 generate the AE evaluation value and the AF evaluation value based on the captured image of each frame (the preprocessed image data) according to procedure 1 and procedure 2. That is, the AE evaluation value generation unit 231 and the AF evaluation value generation unit 251 generate the respective evaluation values at the imaging frame rate (120 fps). Accordingly, the imaging apparatus 10 can obtain more AE and AF evaluation values. Thus, in the imaging apparatus 10, it is possible to realize, for example, a high-speed AF function, i.e., a high focusing speed.

Further, as illustrated in FIG. 3, the AWB evaluation value generation unit 241 included in the imaging apparatus 10 generates an AWB evaluation value based on the synthesis image data according to procedure 2. That is, the AWB evaluation value generation unit 241 generates the evaluation value at the display frame rate (60 fps). Thus, in the imaging apparatus 10, it is possible to obtain the same AWB evaluation value as that in the conventional imaging apparatus.

As described above, the imaging apparatus 10 in the first embodiment generates the evaluation value at the imaging frame rate of the pixel signal output from the image sensor 100. Accordingly, the imaging apparatus 10 in the first embodiment can obtain more evaluation values by increasing the imaging frame rate of the image sensor 100. Thus, in the imaging apparatus 10 of the first embodiment, it is possible to perform control for photography in the imaging apparatus 10 at a high speed.

Further, the imaging apparatus 10 in the first embodiment synthesizes the image data according to the pixel signal output from the image sensor 100 (the captured image of the current frame) with the image data acquired (read) via the DRAM controller 500 (the captured image of the previous frame). That is, the imaging apparatus 10 synthesizes the image data according to the pixel signal output from the image sensor 100 in units of frames. Accordingly, in the imaging apparatus 10 of the first embodiment, the imaging frame rate of the image sensor 100 and the display frame rate of the display device 401 may be different. Even in this case, it is possible to absorb a difference between respective frame rates and display an excellent display image on the display device 401 without decimating frames of the captured image acquired from the image sensor 100, that is, without reducing information of the image.

In the imaging apparatus 10 according to the first embodiment, the imaging frame rate is 120 fps in the example of the operation of the evaluation value generation and the image display illustrated in FIGS. 2A and 2B and the example of schematic timings of the image sensor 100 and the display device 401 illustrated in FIG. 3. The case in which the display frame rate is 60 fps has been described. However, the imaging frame rate and the display frame rate are not limited to a state in the first embodiment. The same may apply to, for example, a case in which the imaging frame rate is 240 fps and the display frame rate is 60 fps. In this case, the synthesis unit 224 synthesizes image data of the captured image corresponding to four frames as the synthesis image data. Also, the imaging apparatus 10 repeats the storage of the synthesis image data (Bayer data) in the DRAM 501 three times, that is, a synthesis process for captured images corresponding to four frames ends in procedure 2, subsequent to procedure 1, and then the display processing unit 400 repeats an operation of performing the generation of the display image and output of the display image to the display device 401 in procedure 2.

Further, the case in which the AE process and the AF process are performed at the imaging frame rate (120 fps) and the AWB process is performed at the display frame rate (60 fps) in the example of the operation of the evaluation value generation and the image display illustrated in FIG. 2 and the example of schematic timings of the image sensor 100 and the display device 401 illustrated in FIG. 3, in the imaging apparatus 10 of the first embodiment, has been described. However, a timing at which the AE process, the AWB process, and the AF process are performed is not limited to the timing of the first embodiment. That is, the imaging apparatus 10 in the first embodiment includes the selector 230, the selector 240, and the selector 250 in preceding stages of the AE evaluation value generation unit 231, the AWB evaluation value generation unit 241, and the AF evaluation value generation unit 251. Accordingly, the respective evaluation value generation units can perform the evaluation value generation process at any one timing of the imaging frame rate (120 fps) and the display frame rate (60 fps).

In the imaging apparatus 10 of the first embodiment, the synthesis unit 224 synthesizes, in units of frames, the image data of the captured image of each frame output from the image sensor 100 at a high imaging frame rate, as described above. Accordingly, in the imaging apparatus 10, in procedure 2, the image data of the previous frame temporarily stored in the DRAM 501, which is acquired (read) by the input DMA unit 270, the synthesis image data stored in the DRAM 501 by the output DMA unit 261, and the synthesis image data stored in the DRAM 501, which is acquired (read) by the display processing unit 400 for display on the display device 401, are exchanged with the DRAM 501 via the DRAM controller 500. That is, the respective image data is present on the data bus 700 at the same time. Increase in the image data present on the data bus 700 at the same time is a cause of squeeze of a bus band of the data bus 700. In actual operation of the imaging apparatus 10, it is necessary to further consider the bus band of the data bus 700.

Figure 4A:
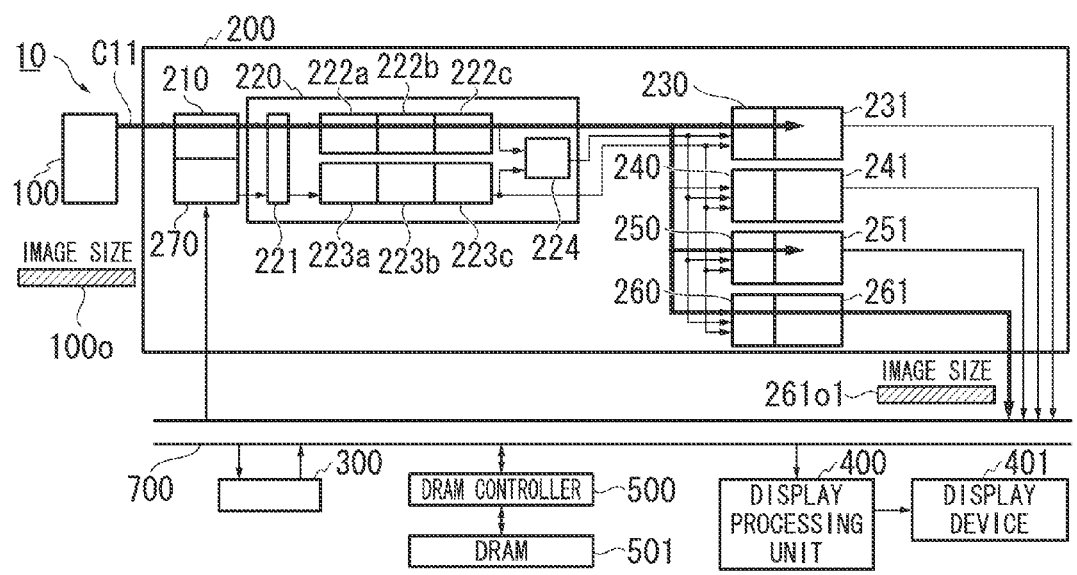
FIG. 4A is a diagram schematically illustrating an example of a bus band when an image is displayed in the imaging apparatus of the first embodiment.
Figure 4B:
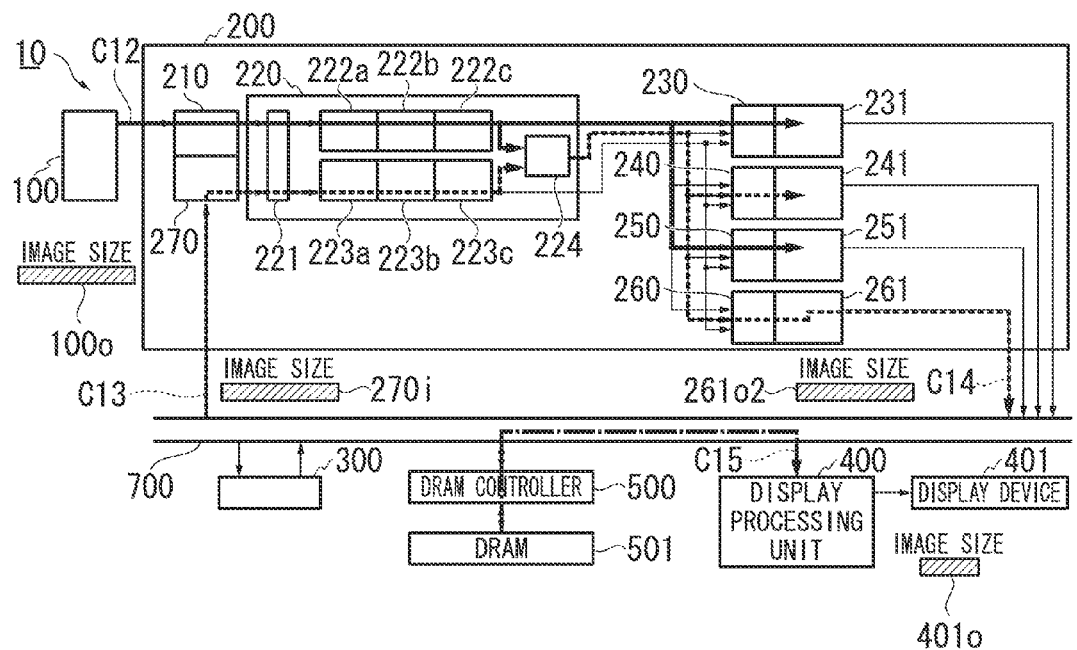
FIG. 4B is a diagram schematically illustrating an example of a bus band when an image is displayed in the imaging apparatus of the first embodiment.

Here, the bus band of the data bus 700 in the imaging apparatus 10 will be described. FIG. 4 is a diagram schematically illustrating an example of the bus band when an image is displayed in the imaging apparatus 10 of the first embodiment. In FIGS. 4A and 4B, diagrams schematically showing sizes of image data exchanged in the respective data paths are added to the example of the operation of the evaluation value generation and the image display illustrated in FIGS. 2A and 2B. Also, in the following description, sizes of image data to be exchanged at the same time on the data bus 700 will be described to describe the bus band of the data bus 700. An image size corresponding to the pixel signal of the image sensor 100 is assumed to be the image size 100$o$ illustrated in FIGS. 4A and 4B.

First, in procedure 1, a pixel signal having an image size 100$o$ is output from the image sensor 100, and a captured image having an image size 261$o$1 (=image size 100$o$) illustrated in FIG. 4A, processed by the imaging processing unit 200, is stored as a captured image of a first frame in the DRAM 501 by the output DMA unit 261.

Subsequently, in procedure 2, the pixel signal having an image size 100$o$ is also output from the image sensor 100 and input to the imaging processing unit 200. Further, in procedure 2, the captured image of the first frame having an image size 270$i$ (=image size 261$o$1) illustrated in FIG. 4B, stored in the DRAM 501, is acquired (read) by the input DMA unit 270 and synthesized by the synthesis unit 224. Also, the synthesis image data having the image size 261$o$2 (=image size 261$o$1) illustrated in FIG. 4B is stored in the DRAM 501 by the output DMA unit 261.

Then, in procedure 2, the synthesis image data having the image size 261$o$2 (=image size 261$o$1) stored in the DRAM 501 is acquired (read) by the display processing unit 400. Also, the display processing unit 400 performs a display process such as resizing (reducing) on the acquired (read) synthesis image data having the image size 261$o$2 (=image size 261$o$1) to generate a display image having an image size 4010 (<image size 261$o$2) illustrated in FIG. 4B.

Thus, when the captured image according to the pixel signal input from the image sensor 100 is sequentially displayed on the display device 401, particularly, the input DMA unit 270 acquires (reads) the captured image of the first frame stored in the DRAM 501. A time when the output DMA unit 261 stores the synthesis image data in the DRAM 501 is a time when the bus band of the data bus 700 is squeezed in the imaging apparatus 10$a$. This is because image data of the captured images corresponding to two frames accessed by the input DMA unit 270 and the output DMA unit 261 is present on the data bus 700 at the same time.

However, as can be seen from FIG. 4, a size of a display image that can be displayed by the display device 401 is much smaller than a size of the captured image according to the pixel signal output from the image sensor 100. Accordingly, a size of image data smaller than the captured image according to the pixel signal output from the image sensor 100 is sufficient as the size of the image data for generation of the display image in the display processing unit 400. A difference between the size of the captured image and the size of the display image is more noticeable as the number of pixels of the image sensor 100 increases. Accordingly, the squeeze of the bus band of the data bus 700 can be reduced by appropriately adjusting a size of image data present on the data bus 700 at the same time.

Further, in the imaging apparatus 10, for example, the image processing unit 300 may perform various image processing on the synthesis image data, in addition to the captured image according to the pixel signal input from the image sensor 100 being sequentially displayed on the display device 401. For this, it is necessary to reduce a load of the process in the image processing unit 300, but reduction of squeeze of the bus band of the data bus 700 is also useful for comfortable operation of the imaging apparatus 10.

Second Embodiment

Figure 5:
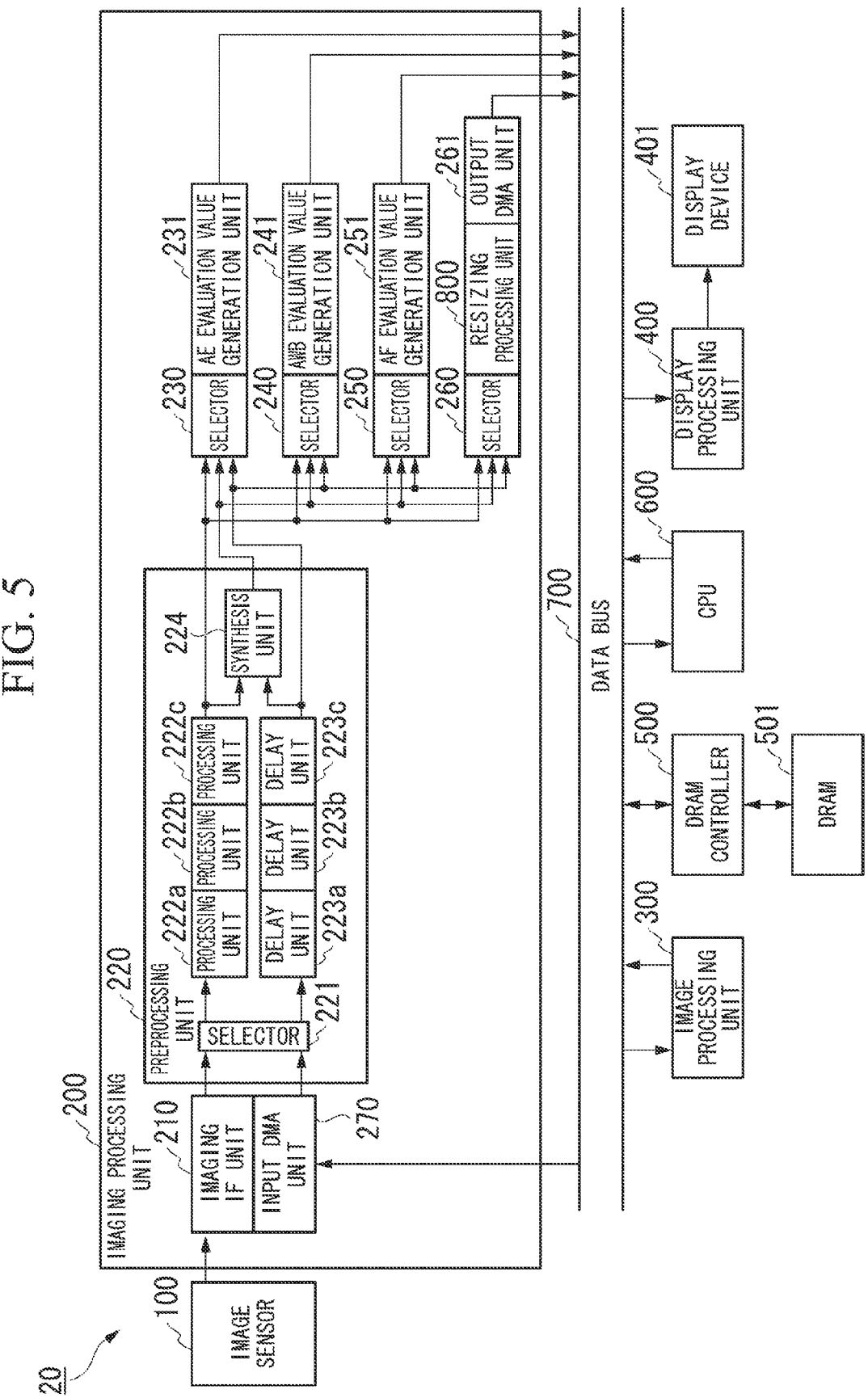
FIG. 5 is a block diagram illustrating a schematic configuration of an imaging apparatus in a second embodiment of the present invention.

Next, an imaging apparatus of a second embodiment of the present invention will be described. FIG. 5 is a block diagram illustrating a schematic configuration of an imaging apparatus in the second embodiment. An imaging apparatus 20 of the second embodiment includes a resizing processing unit 800 added between the selector 260 and the output DMA unit 261 in the imaging processing unit 200 in the imaging apparatus 10 of the first embodiment illustrated in FIG. 1. Other components are the same as those of the imaging apparatus 10 of the first embodiment. Accordingly, only configurations and operations different from those of the imaging apparatus 10 of the first embodiment illustrated in FIG. 1 will be described in the description of the imaging apparatus 20 of the second embodiment and a detailed description thereof will be omitted. In the following description, the same components of the imaging apparatus 20 of the second embodiment as those of the imaging apparatus 10 of the first embodiment illustrated in FIG. 1 will be described using the same reference numerals as those of the imaging apparatus 10.

The selector 260 selects any one of the preprocessed image data, the delayed image data, and the synthesis image data input from the preprocessing unit 220. The selected image data is output to the resizing processing unit 800 as original image data to be processed by the image processing unit 300 or the display processing unit 400 by the selector 260.

The resizing processing unit 800 resizes (reduces) the image data input from the selector 260, for example, to a predetermined size of an image that can be displayed by the display device 401. Also, the resizing processing unit 800 outputs the resized (reduced) image data as original image data to be displayed on the display device 401 to the output DMA unit 261. Since a resizing (reducing) processing method in the resizing processing unit 800 is the same as, for example, the resizing (reducing) processing method performed in the display processing unit 400, a detailed description thereof will be omitted here.

The resizing processing unit 800 has a function of determining whether to perform the resizing (reducing) process on the image data input from the selector 260, that is, setting the resizing (reducing) process to ON or OFF. Switching between ON and OFF of the resizing (reducing) process in the resizing processing unit 800 is controlled by the CPU 600 in each procedure of operation of the evaluation value generation and the image display in the imaging apparatus 20.

The output DMA unit 261 stores the image data input from the resizing processing unit 800 in the DRAM 501 via the DRAM controller 500 through DMA.

The display processing unit 400 acquires (reads) the image data after the resizing (reducing) process stored in the DRAM 501. The display processing unit 400 generates image data for display (hereinafter also referred to as a "display image") obtained by performing a display process such as image processing for display or a process of superimposing OSD display data, rather than the resizing (reducing) process, on the acquired image data. Also, the display processing unit 400 outputs the generated image data for display (display image) to the display device 401 or an external display, which is not shown.

The display processing unit 400 may be configured to perform only a display process such as a process of superimposing OSD display data. In this case, for example, the image processing unit 300 generates image data for display obtained by performing image processing for display, rather than the resizing (reducing) process, on the image data acquired (read) from the DRAM 501. The image processing unit 300 stores (writes) the generated image data for display in the DRAM 501 again. Also, the display processing unit 400 acquires (reads) the image data for display stored in the DRAM 501 and performs a display process such as the process of superimposing OSD display data on the acquired image data for display.

Figure 6A:
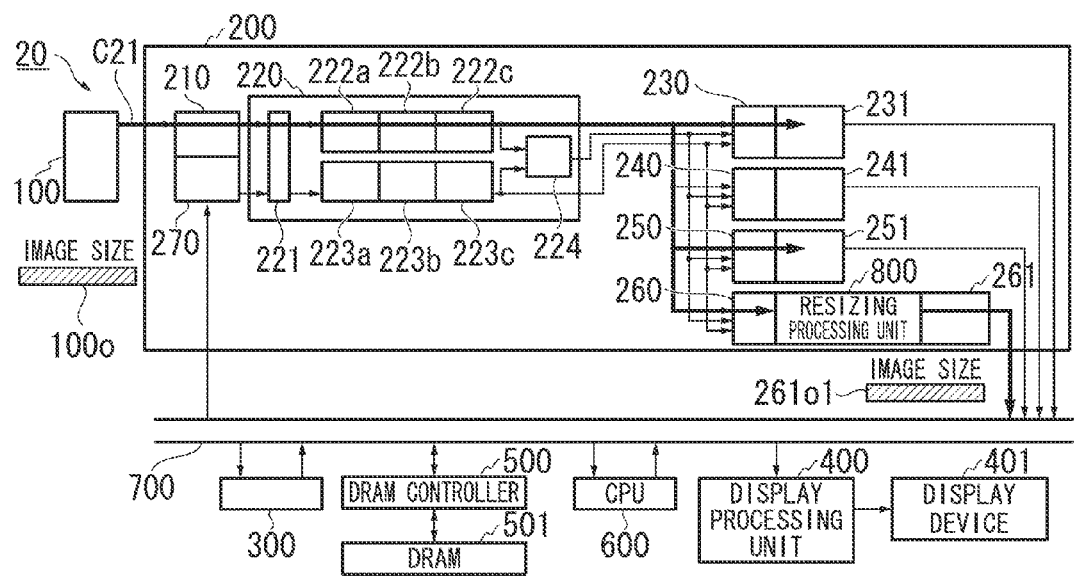
FIG. 6A is a diagram schematically illustrating an example of operation of evaluation value generation and image display in the imaging apparatus of the second embodiment, and a bus band.
Figure 6B:
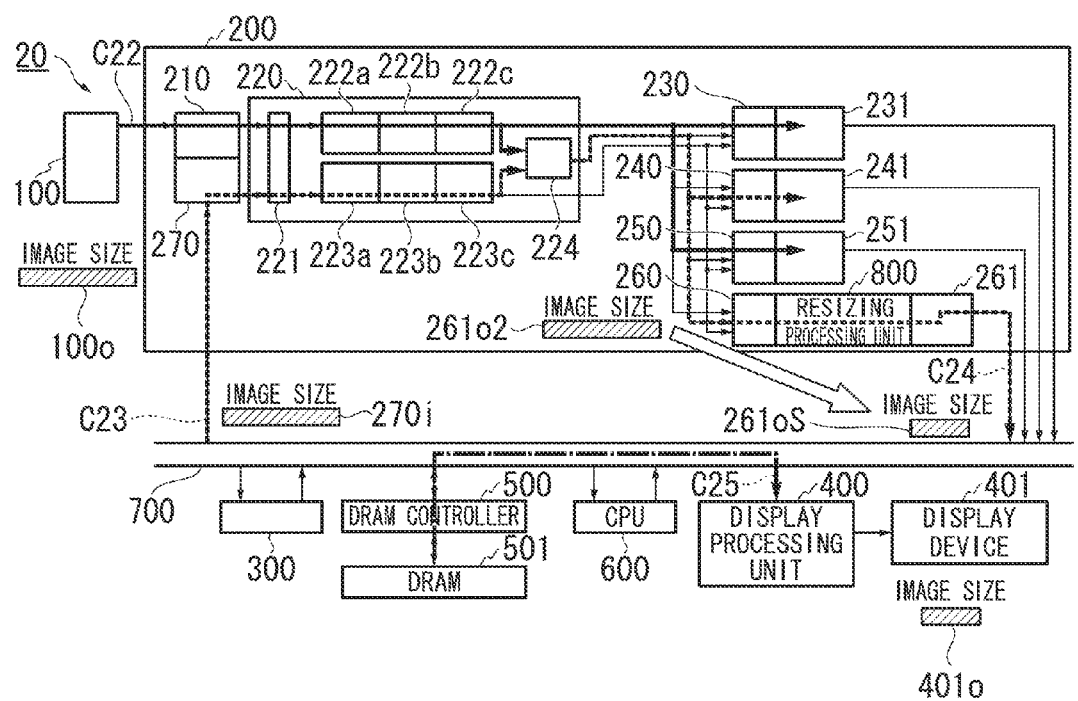
FIG. 6B is a diagram schematically illustrating an example of operation of evaluation value generation and image display in the imaging apparatus of the second embodiment, and a bus band.

Next, an example of an operation of the imaging apparatus 20 of the present embodiment will be described. FIGS. 6A and 6B are a diagram schematically illustrating an example of operation of the evaluation value generation and the image display according to the imaging apparatus 20 of the second embodiment, and a bus band. The imaging apparatus 20 sequentially displays a captured image according to the pixel signal output from the image sensor 100 at a display frame rate on the display device 401 while generating the AE evaluation value, the AWB evaluation value, and the AF evaluation value for control of AE, AWB, and AF for photography, similar to the imaging apparatus 10 of the first embodiment.

In FIGS. 6A and 6B, data paths in the evaluation value generation operation and the image display operation are shown on the block diagram of the imaging apparatus 20 illustrated in FIG. 5. Further, in FIGS. 6A and 6B, diagrams schematically showing sizes of image data exchanged in the respective data paths are additionally illustrated. Also, in the following description, respective process procedures of the evaluation value generation operation and the image display operation in the imaging apparatus 20 will be described in order, and the size of image data to be exchanged at the same time on the data bus 700 will be described. Accordingly, a bus band of the data bus 700 will be described. Further, in the following description, an image size corresponding to the pixel signal of the image sensor 100 is assumed to be equal to the image size 100$o$ in the imaging apparatus 10 of the first embodiment illustrated in FIGS. 4A and 4B.

Since a timing relationship between the image sensor 100 and the display device 401 in the example of the operation of the evaluation value generation and the image display in the imaging apparatus 20 illustrated in FIGS. 6A and 6B is the same as the timing relationship between the image sensor 100 and the display device 401 in the imaging apparatus 10 of the first embodiment illustrated in FIG. 3, a detailed description thereof will be omitted here.

(Procedure 1): First, in procedure 1, the CPU 600 controls the selector 221, the selector 230, the selector 240, the selector 250, and the selector 260 to select, for example, a path C21 illustrated in FIG. 6A as a data path. Also, the imaging apparatus 20 preprocesses the image data according to the pixel signal output from the image sensor 100, and generates the evaluation value based on the resultant preprocessed image data (Bayer data). Further, the imaging apparatus 20 stores the preprocessed image data (Bayer data) in the DRAM 501 via the DRAM controller 500. In procedure 1, the CPU 600 sets the resizing (reducing) process of the resizing processing unit 800 to OFF and does not perform the resizing (reducing) process.

More specifically, a pixel signal having an image size 100$o$ output from the image sensor 100 is input to the imaging processing unit 200, and the imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222$a$, and the processing units 222$a$ to 222$c$ sequentially perform preprocessing (correction process) on the input image data. The preprocessing unit 220 outputs preprocessed image data after the preprocessing (correction process) in the processing unit 222$c$ to each of the selector 230, the selector 250, and the selector 260. Also, the selector 230, the selector 250, and the selector 260 output the preprocessed image data input from the preprocessing unit 220 to the AE evaluation value generation unit 231, the AF evaluation value generation unit 251, and the output DMA unit 261 corresponding thereto, respectively.

The AE evaluation value generation unit 231 and the AF evaluation value generation unit 251 store an AE evaluation value and an AF evaluation value calculated (generated) based on the preprocessed image data input from the preprocessing unit 220 in the DRAM 501 via the DRAM controller 500. Further, the output DMA unit 261 stores the preprocessed image data (Bayer data) input from the preprocessing unit 220 as a captured image of a first frame in the DRAM 501 via the DRAM controller 500.

Here, the output DMA unit 261 stores the captured image (the preprocessed image data) having an image size 261$o1$ (=image size 100$o$) illustrated in FIG. 6A as a captured image of a first frame in the DRAM 501.

(Procedure 2): Subsequently, in procedure 2, the CPU 600 controls the selector 221, the selector 230, the selector 240, the selector 250, and the selector 260. For example, the CPU 600 selects a path C22, a path C23, and a path C24 illustrated in FIG. 6B as respective data paths. Further, in procedure 2, the CPU 600 sets the resizing (reducing) process of the resizing processing unit 800 to ON. Also, the imaging apparatus 20 preprocesses the image data according to the pixel signal output from the image sensor 100 and generates the evaluation value based on the resultant preprocessed image data (Bayer data), as in procedure 1.

Further, simultaneously, the imaging apparatus 20 acquires (reads) the captured image of the first frame stored in the DRAM 501, and synthesizes image data of the acquired captured image of the first frame with the resultant preprocessed image data (Bayer data). The imaging apparatus 20 generates the evaluation value based on the synthesized image data (Bayer data). Further, the imaging apparatus 20 performs the resizing (reducing) process on the synthesized image data (Bayer data), and stores resultant image data in the DRAM 501 via the DRAM controller 500.

More specifically, a pixel signal having an image size 100$o$ output from the image sensor 100 is input to the imaging processing unit 200, and the imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222$a$, and the respective processing units 222$a$ to 222$c$ sequentially perform preprocessing (correction process) on the input image data and output the resultant image data to the synthesis unit 224. Further, the preprocessing unit 220 outputs preprocessed image data after the preprocessing (correction process) in the processing unit 222$c$ to the AE evaluation value generation unit 231 via the selector 230 and to the AF evaluation value generation unit 251 via the selector 250 (see a path C22).

Further, simultaneously, the input DMA unit 270 in the imaging processing unit 200 acquires (reads) the captured image of the first frame having an image size 270$i$ (=image size 261$o1$) illustrated in FIG. 6B, which has been stored in the DRAM 501, via the DRAM controller 500. The input DMA unit 270 outputs image data of the acquired captured image of the first frame to the preprocessing unit 220. Also, the selector 221 in the preprocessing unit 220 sends the image data of the captured image of the first frame input from the input DMA unit 270 to the delay unit 223$a$. Each of the delay units 223$a$ to 223$c$ delays the input image data of the captured image of the first frame by a predetermined time and outputs the resultant image data to the synthesis unit 224 (see a path C23).

Also, the synthesis unit 224 generates synthesis image data having an image size 261$o2$ (=image size 261$o1$) illustrated in FIG. 6B by synthesizing preprocessed image data after the preprocessing (correction process) in the processing unit 222$c$, that is, a captured image of a second frame with the delayed image data from the delay unit 223$c$, that is, the captured image of the first frame. Also, the preprocessing unit 220 outputs the synthesis image data generated by the synthesis unit 224 to the AWB evaluation value generation unit 241 via the selector 240 and to the output DMA unit 261 via the selector 260. Also, the output DMA unit 261 stores synthesis image data (Bayer data) having an image size 261oS (<image size 261o2) illustrated in FIG. 6B, obtained by performing the resizing (reducing) process on the synthesis image data (Bayer data) input from the preprocessing unit 220, in the DRAM 501 via the DRAM controller 500 (see a path C24).

Further, the AE evaluation value generation unit 231 and the AF evaluation value generation unit 251 store an AE evaluation value and an AF evaluation value calculated (generated) based on the preprocessed image data (the captured image of the second frame) input from the preprocessing unit 220 in the DRAM 501 via the DRAM controller 500. Further, the AWB evaluation value generation unit 241 calculates (generates) an AWB evaluation value based on the synthesis image data input from the preprocessing unit 220 and stores the generated AWB evaluation value in the DRAM 501 via the DRAM controller 500.

Then, the imaging apparatus 20 displays the display image according to the synthesis image data (Bayer data) subjected to the resizing (reducing) process, stored in the DRAM 501, on the display device 401. In this case, for example, data is input to the display processing unit 400 along a path C25 illustrated in FIG. 6B.

More specifically, the display processing unit 400 acquires (reads) the synthesis image data having an image size 261oS (<image size 261o2), stored in the DRAM 501, via the DRAM controller 500. The display processing unit 400 generates image data for display (display image) obtained by performing a display process other than the resizing (reducing) process on the acquired synthesis image data.

Also, the display processing unit 400 outputs the generated display image to the display device 401. Accordingly, a display image according to the synthesis image data subjected to the resizing (reducing) process in the resizing processing unit 800 is displayed on the display device 401.

Then, the imaging apparatus 20 repeats the calculation (generation) of the AE evaluation value and the AF evaluation value based on the captured image of the first frame (the preprocessed image data) and the storage of the captured image of the first frame (Bayer data) in the DRAM 501 in procedure 1, and the calculation (generation) of the AE evaluation value and the AF evaluation value based on the captured image of the second frame (the preprocessed image data), the generation of the synthesis image data, the calculation (generation) of the AWB evaluation value based on the synthesis image data, and the storage of the synthesis image data (Bayer data) subjected to the resizing (reducing) process in the DRAM 501 in procedure 2. Further, the display processing unit 400 repeats the generation of the display image according to the synthesis image data (Bayer data) subjected to the resizing (reducing) process and output of the display image to the display device 401 in procedure 2.

Thus, in the imaging apparatus 20, the CPU 600 selects the path for processing the image data as shown in FIGS. 6A and 6B using the selector 221, the selector 230, the selector 240, the selector 250, and the selector 260 in each process procedure. Accordingly, in the imaging apparatus 20, it is possible to sequentially display the display image according to the pixel signal from the image sensor 100 on the display device 401 at a display frame rate while generating the respective evaluation values for photography control (control of AE, AWB, and AF) based on the image data according to the pixel signal from the image sensor 100.

In this case, the display image displayed on the display device 401 is an image according to the synthesis image data obtained by synthesizing the captured image of the first frame with the captured image of the second frame. Accordingly, even when an imaging frame rate for generation of the evaluation value using the pixel signal input from the image sensor 100 and a frame rate at which the synthesis image data is displayed on the display device 401 are different frame rates, it is possible to obtain more evaluation values at the imaging frame rate. Further, the synthesis image data for generation of the display image is synthesis image data subjected to the resizing (reducing) process. Accordingly, in the imaging apparatus 20, it is possible to reduce squeeze of the bus band of the data bus 700. It is also possible to reduce a load of the process when the display processing unit 400 generates the display image.

While the case in which the synthesis unit 224 synthesizes the image data of the captured images corresponding to the two frames as the synthesis image data has been described in the example of the operation of the evaluation value generation and the image display in the imaging apparatus 20 illustrated in FIGS. 6A and 6B, image data of the captured image of more frames may be synthesized according to the imaging frame rate and the display frame rate.

Figure 7A:
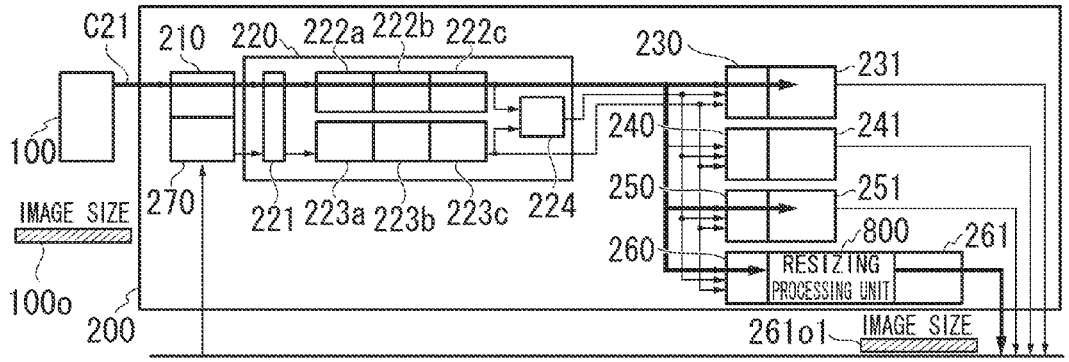
FIG. 7A is a diagram schematically illustrating another example of operation of evaluation value generation and image display in the imaging apparatus of the second embodiment, and a bus band.
Figure 7B:
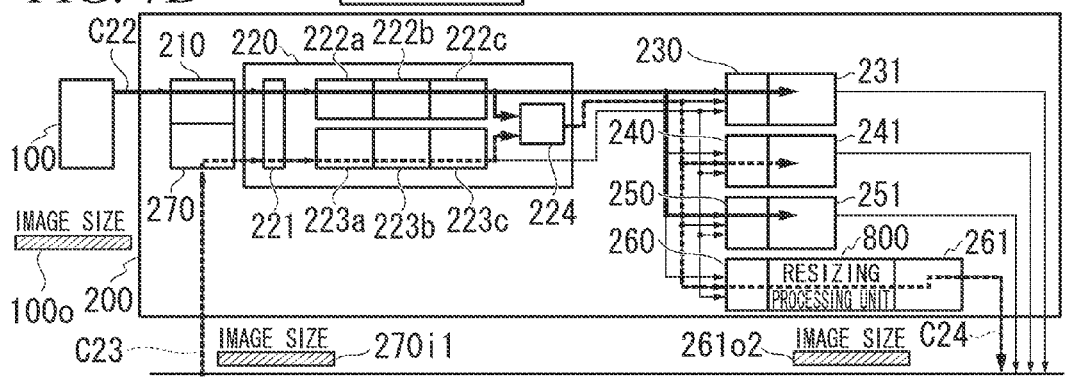
FIG. 7B is a diagram schematically illustrating another example of operation of evaluation value generation and image display in the imaging apparatus of the second embodiment, and a bus band.
Figure 7C:
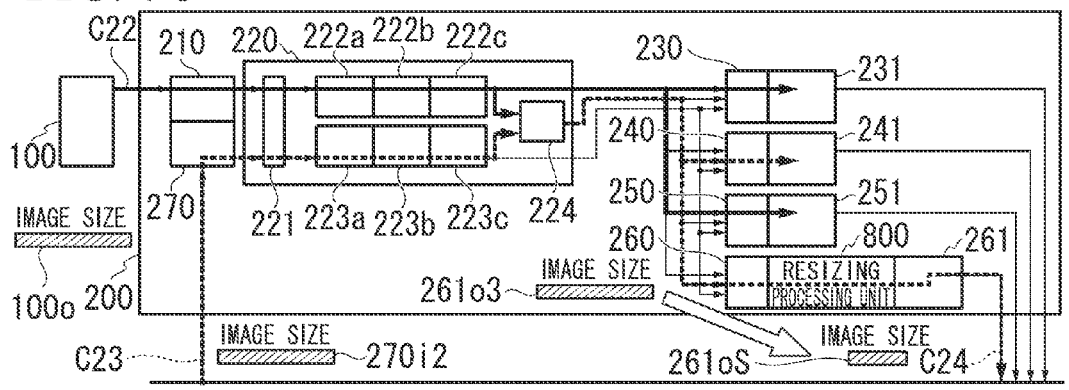
FIG. 7C is a diagram schematically illustrating another example of operation of evaluation value generation and image display in the imaging apparatus of the second embodiment, and a bus band.

Another example of the operation of the imaging apparatus 20 of the present embodiment will be described herein. FIGS. 7A, 7B and 7C are diagrams schematically illustrating another example of the operation of the evaluation value generation and the image display according to the imaging apparatus 20 of the second embodiment, and the bus band. In FIGS. 7A, 7B and 7C, an example of an operation of the evaluation value generation and the image display when image data of captured images corresponding to three frames is synthesized as the synthesis image data is illustrated. Even in the example of the operation illustrated in FIGS. 7A, 7B and 7C, the imaging apparatus 20 sequentially displays the captured image according to the pixel signal output from the image sensor 100 on the display device 401 at a display frame rate while generating the AE evaluation value, the AWB evaluation value, and the AF evaluation value for control of AE, AWB, and AF for photography, similar to the example of the operation illustrated in FIGS. 6A and 6B.

In FIGS. 7A, 7B and 7C, data paths in the evaluation value generation operation and the image display operation, and diagrams schematically showing sizes of image data exchanged in the respective data paths are shown on the block diagram of the imaging apparatus 20 illustrated in FIG. 5, similar to the example of the operation illustrated in FIGS. 6A and 6B. In the following description, respective process procedures of the evaluation value generation operation and the image display operation in the imaging apparatus 20, and a bus band of the data bus 700 will be described focusing on a different operation from the operation illustrated in FIGS. 6A and 6B. An image size corresponding to the pixel signal of the image sensor 100 is assumed to be the same size (image size 100o) as that in the example of the operation illustrated in FIGS. 6A and 6B.

A timing relationship between the image sensor 100 and the display device 401 in the example of the operation illustrated in FIGS. 7A, 7B and 7C differs from the timing relationship between the image sensor 100 and the display device 401 in the imaging apparatus 10 of the first embodiment illustrated in FIG. 3 in that the number of captured images to be synthesized is changed from two frames to three frames. Accordingly, since the timing relationship between the image sensor 100 and the display device 401 in the example of the operation illustrated in FIGS. 7A, 7B and 7C can be considered to be the same as the timing relationship between the image sensor 100 and the display device 401 in the imaging apparatus 10 of the first embodiment illustrated in FIG. 3, a detailed description thereof will be omitted.

(Procedure 1): First, in procedure 1, the CPU 600 controls each selector 221 to select a path C21 illustrated in FIG. 7A as a data path, as in procedure 1 in the operation illustrated in FIGS. 6A and 6B. Also, the imaging apparatus 20 preprocesses image data according to a pixel signal having an image size 100o output from the image sensor 100 and generates the evaluation value based on the resultant preprocessed image data (Bayer data).

Further, the imaging apparatus 20 stores the preprocessed image data (Bayer data) as a captured image of a first frame in the DRAM 501 via the DRAM controller 500, as in procedure 1 in the operation illustrated in FIGS. 6A and 6B. Here, the output DMA unit 261 stores the captured image (the preprocessed image data) having an image size 261o1 (=image size 100o) illustrated in FIG. 7A as the captured image of the first frame, in the DRAM 501. In procedure 1, the CPU 600 sets the resizing (reducing) process of the resizing processing unit 800 to OFF and does not perform the resizing (reducing) process.

(Procedure 2): Subsequently, in procedure 2, the CPU 600 controls the selector 221, the selector 230, the selector 240, the selector 250, and the selector 260 to select a path C22, a path C23, and a path C24 illustrated in FIG. 7B as data paths. Also, the imaging apparatus 20 preprocesses the image data according to the pixel signal output from the image sensor 100, and generates the evaluation value based on the resultant preprocessed image data (Bayer data), as in procedure 1.

Further, simultaneously, the imaging apparatus 20 acquires (reads) the captured image of the first frame stored in the DRAM 501, and synthesizes image data of the acquired captured image of the first frame with the resultant preprocessed image data (Bayer data) to generate the evaluation value based on the synthesized image data (Bayer data). Further, the imaging apparatus 20 stores the synthesized image data (Bayer data) as a captured image of the first frame plus the second frame in the DRAM 501 via the DRAM controller 500. Even in procedure 2, the CPU 600 sets the resizing (reducing) process of the resizing processing unit 800 to OFF and does not perform the resizing (reducing) process.

More specifically, a pixel signal having an image size 100o output from the image sensor 100 is input to the imaging processing unit 200, and the imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222a, and the respective processing units 222a to 222c sequentially perform preprocessing (correction process) on the input image data, and output the resultant image data to the synthesis unit 224. Further, the preprocessing unit 220 outputs the preprocessed image data after the preprocessing (correction process) in the processing unit 222c to the AE evaluation value generation unit 231 via the selector 230 and to the AF evaluation value generation unit 251 via the selector 250 (see a path C22).

Further, simultaneously, the input DMA unit 270 in the imaging processing unit 200 acquires (reads) the captured image of the first frame having an image size 270i1 (=image size 261o1) illustrated in FIG. 7B, stored in the DRAM 501, via the DRAM controller 500. The input DMA unit 270 outputs image data of the acquired captured image of the first frame to the preprocessing unit 220.

Also, the selector 221 in the preprocessing unit 220 sends the image data of the captured image of the first frame input from the input DMA unit 270 to the delay unit 223a, and each of the delay units 223a to 223c delays the input image data of the captured image of the first frame by a predetermined time and outputs the resultant image data to the synthesis unit 224 (see a path C23).

Also, the synthesis unit 224 generates synthesis image data having an image size 261o2 (=image size 261o1) illustrated in FIG. 7B by synthesizing the preprocessed image data after the preprocessing (correction process) in the processing unit 222c, that is, a captured image of a second frame with the delayed image data from the delay unit 223c, that is, the captured image of the first frame. Also, the preprocessing unit 220 outputs the synthesis image data generated by the synthesis unit 224 to the AWB evaluation value generation unit 241 via the selector 240 and to the output DMA unit 261 via the selector 260. Also, the output DMA unit 261 stores the synthesis image data (Bayer data) having an image size 261o2 (=image size 100o) illustrated in FIG. 7B, input from the preprocessing unit 220, as a captured image of a first frame plus a second frame in the DRAM 501 via the DRAM controller 500 (see a path C24).

Further, the AE evaluation value generation unit 231 and the AF evaluation value generation unit 251 store an AE evaluation value and an AF evaluation value calculated (generated) based on the preprocessed image data (the captured image of the second frame) input from the preprocessing unit 220 in the DRAM 501 via the DRAM controller 500. Further, the AWB evaluation value generation unit 241 calculates (generates) an AWB evaluation value based on the synthesis image data input from the preprocessing unit 220 and stores the generated AWB evaluation value in the DRAM 501 via the DRAM controller 500.

(Procedure 3): Subsequently, in procedure 3, the resizing (reducing) process of the resizing processing unit 800 is set to ON, as in procedure 2 in the operation illustrated in FIGS. 6A and 6B. As data paths in procedure 3, the same paths as those in procedure 2, that is, paths C22, C23, and C24 illustrated in FIGS. 7B and 7C, are selected by the CPU 600. Also, the imaging apparatus 10 preprocesses image data according to a pixel signal having an image size 100o output from the image sensor 100 and generates the evaluation value based on the resultant preprocessed image data (Bayer data), as in procedure 1 and procedure 2.

Further, simultaneously, the imaging apparatus 20 acquires (reads) the captured image of the first frame plus the second frame stored in the DRAM 501, as in procedure 2 in the operation illustrated in FIGS. 6A and 6B. The imaging apparatus 20 synthesizes image data of the acquired captured image of the first frame plus the second frame with the resultant preprocessed image data (Bayer data) and generates the evaluation value based on the synthesized image data (Bayer data).

Further, the imaging apparatus 20 performs a resizing (reducing) process on the synthesized image data (Bayer data), and stores resultant image data in the DRAM 501 via the DRAM controller 500.

More specifically, a pixel signal having an image size 100o output from the image sensor 100 is input to the imaging processing unit 200, and the imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222a, and the respective processing units 222a to 222c sequentially perform preprocessing (correction process) on the input image data and output the resultant image data to the synthesis unit 224. Further, the preprocessing unit 220 outputs preprocessed image data after the preprocessing (correction process) in the processing unit 222c to the AE evaluation value generation unit 231 via the selector 230 and to the AF evaluation value generation unit 251 via the selector 250 (see a path C22).

Further, simultaneously, the input DMA unit 270 in the imaging processing unit 200 acquires (reads) a captured image of a first frame plus a second frame having an image size 270i2 (=image size 261o2) illustrated in FIG. 7C, stored in the DRAM 501, via the DRAM controller 500. The input DMA unit 270 outputs the image data of the acquired captured image of the first frame plus the second frame to the preprocessing unit 220. Also, the selector 221 in the preprocessing unit 220 sends the image data of the captured image of the first frame plus the second frame input from the input DMA unit 270 to the delay unit 223a, and each of the delay units 223a to 223c delays the input image data of the captured image of the first frame plus the second frame by a predetermined time, and outputs resultant image data to the synthesis unit 224 (see a path C23).

Also, the synthesis unit 224 generates synthesis image data having an image size 261o3 (=image size 261o2) illustrated in FIG. 7C by synthesizing preprocessed image data after the preprocessing (correction process) in the processing unit 222c, that is, the captured image of the third frame with the delayed image data from the delay unit 223c, that is, the captured image of the first frame plus a second frame.

Also, the preprocessing unit 220 outputs the synthesis image data generated by the synthesis unit 224 to the AWB evaluation value generation unit 241 via the selector 240 and to the output DMA unit 261 via the selector 260. Also, the output DMA unit 261 stores synthesis image data (Bayer data) having an image size 261oS (<an image size 261o3) illustrated in FIG. 7C, which is obtained by performing the resizing (reducing) process on the synthesis image data (Bayer data) input from the preprocessing unit 220, in the DRAM 501 via the DRAM controller 500 (see a path C24).

Further, the AE evaluation value generation unit 231 and the AF evaluation value generation unit 251 store an AE evaluation value and an AF evaluation value calculated (generated) based on the preprocessed image data input from the preprocessing unit 220 (the captured image of the third frame), in the DRAM 501 via the DRAM controller 500. Further, the AWB evaluation value generation unit 241 calculates (generates) an AWB evaluation value based on the synthesis image data input from the preprocessing unit 220 and stores the generated AWB evaluation value in the DRAM 501 via the DRAM controller 500.

Then, the imaging apparatus 20 displays a display image according to the synthesis image data (Bayer data) having the image size 261oS (<image size 261o2) subjected to the resizing (reducing) process, stored in the DRAM 501, on the display device 401. In this case, data is input to the display processing unit 400 along the path C25 illustrated in FIG. 7C.

Then, the imaging apparatus 20 repeats the operation of procedure 1 to procedure 3. Further, the imaging apparatus 20 repeats the display of the display image according to the synthesis image data (Bayer data) subjected to the resizing (reducing) process on the display device 401 in procedure 3.

Thus, in the imaging apparatus 20, the CPU 600 selects the path for processing the image data, as illustrated in FIGS. 7A, 7B and 7C, using the selector 221, the selector 230, the selector 240, the selector 250, and the selector 260 in each process procedure. Further, the CPU 600 controls ON or OFF of the resizing (reducing) process in the resizing processing unit 800. Accordingly, in the imaging apparatus 20, it is possible to sequentially display the display image according to the pixel signal from the image sensor 100 on the display device 401 at a display frame rate while generating the respective evaluation values for photography control (control of AE, AWB, and AF) based on the image data according to the pixel signal from the image sensor 100.

In this case, the display image displayed on the display device 401 is an image according to synthesis image data obtained by synthesizing captured images of all frames (three frames in the example of the operation illustrated in FIG. 7) acquired at the imaging frame rate, included in the display frame rate. Accordingly, even when an imaging frame rate for generation of the evaluation value using the pixel signal input from the image sensor 100 and a frame rate at which the synthesis image data is displayed on the display device 401 are different frame rates, it is possible to obtain more evaluation values at the imaging frame rate. Further, the synthesis image data for generation of the display image is synthesis image data subjected to the resizing (reducing) process. Accordingly, in the imaging apparatus 20, it is possible to reduce squeeze of the bus band of the data bus 700. It is also possible to reduce a load of the process when the display processing unit 400 generates the display image.

While the example in which the AWB evaluation value generation unit 241 does not generate the evaluation value in procedure 1 has been described in the example of the operation of the evaluation value generation and the image display in the imaging apparatus 20 illustrated in FIGS. 6A and 6B, and FIGS. 7A, 7B and 7C, the AE evaluation value generation unit 231, the AWB evaluation value generation unit 241, and the AF evaluation value generation unit 251 may generate the respective evaluation values in procedure 1. That is, the AE evaluation value, the AWB evaluation value, and the AF evaluation value may be generated from the captured image of the current frame that is the preprocessed image data according to the pixel signal from the image sensor 100, and the synthesis image data may be used as the image data for display on the display device 401.

As described above, even in the imaging apparatus 20 of the second embodiment, the evaluation value is generated at the imaging frame rate of the pixel signal output from the image sensor 100, as in the imaging apparatus 10 of the first embodiment. Accordingly, even in the imaging apparatus 20 of the second embodiment, it is possible to obtain more evaluation values and to perform photography control at a high speed in the imaging apparatus 20 by increasing the imaging frame rate of the image sensor 100, as in the imaging apparatus 10 of the first embodiment.

Further, in the imaging apparatus 20 of the second embodiment, the image data according to the pixel signal output from the image sensor 100 is synthesized in units of frames, as in the imaging apparatus 10 of the first embodiment. Accordingly, even in the imaging apparatus 20 of the second embodiment, the imaging frame rate of the image sensor 100 and the display frame rate of the display device 401 may be different, as in the imaging apparatus 10 of the first embodiment. Even in this case, it is possible to display an excellent display image on the display device 401 without decimating frames of the captured image acquired from the image sensor 100.

Further, in the imaging apparatus 20 of the second embodiment, image data used by the display processing unit 400 to generate the display image is subjected to the resizing (reducing) process in advance, and the image data after the resizing (reducing) process is stored in the DRAM 501. Accordingly, in the imaging apparatus 20 of the second embodiment, it is possible to reduce the squeeze of the bus band of the data bus 700. It is also possible to reduce a load of the process when the display processing unit 400 generates the display image.

In the imaging apparatus 20 of the second embodiment, the configuration in which one resizing processing unit 800 is added between the selector 260 and the output DMA unit 261 as in the block diagram illustrated in FIG. 5 has been described. However, the resizing processing unit included in the imaging apparatus 20 is not limited to one resizing processing unit. For example, when there are a plurality of image data to be subjected to the resizing (reducing) process, the configuration may include a plurality of resizing processing units, as illustrated in FIG. 8.

First Modified Example of Second Embodiment

Figure 8:
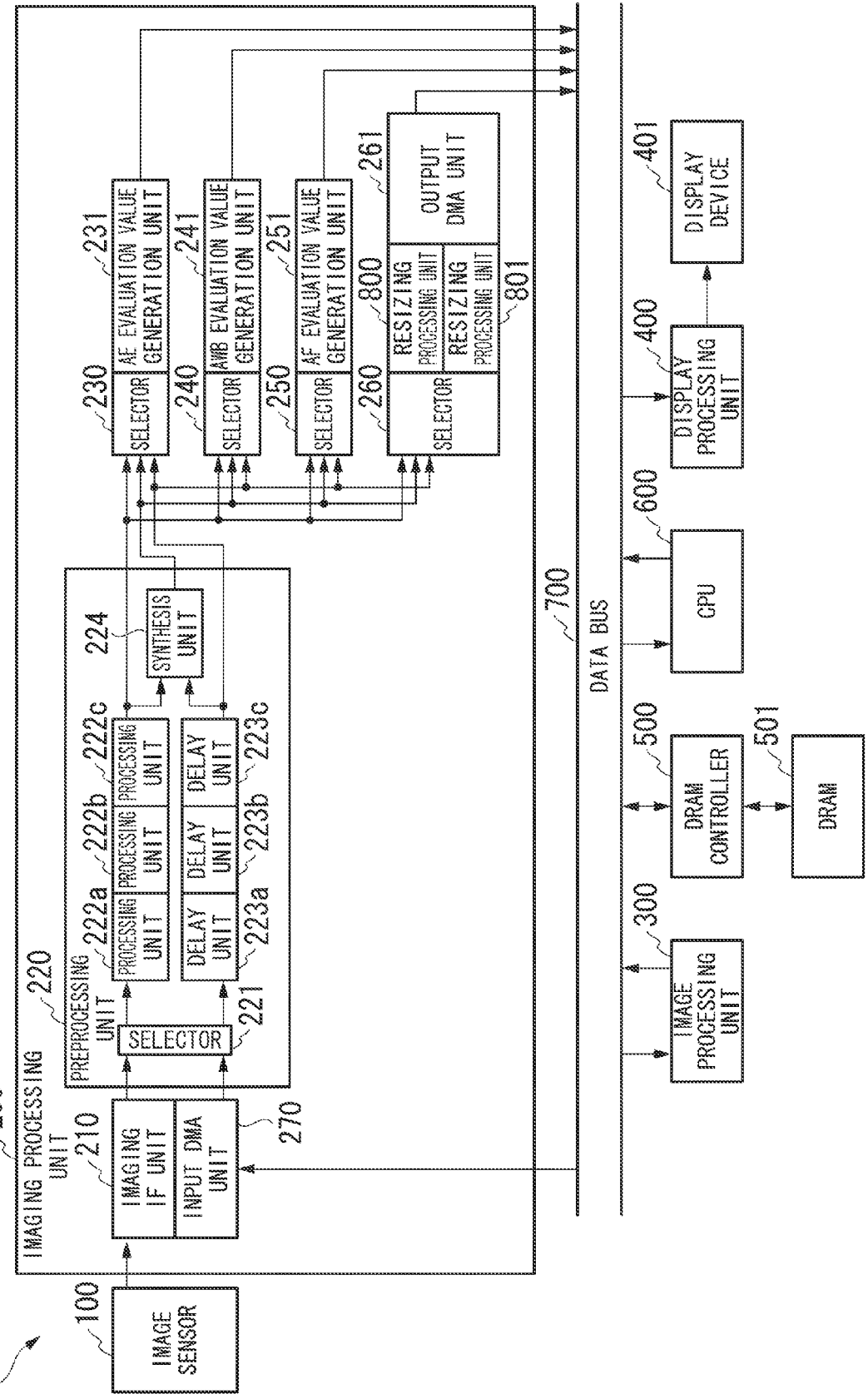
FIG. 8 is a block diagram illustrating another schematic configuration of the imaging apparatus in the second embodiment.

FIG. 8 is a block diagram illustrating another schematic configuration of the imaging apparatus 20 in the second embodiment. In the following description, the imaging apparatus illustrated in FIG. 8 is referred to as an imaging apparatus 21. The imaging apparatus 21 includes a resizing processing unit 801 that performs a resizing (reducing) process to a predetermined size of an image from that in the resizing processing unit 800, which is added in parallel to the resizing processing unit 800 in the imaging processing unit 200 of the imaging apparatus 20 illustrated in FIG. 5. Accordingly, since the operation of the imaging apparatus 21 is the same as that of the imaging apparatus 20 of the second embodiment except that two types of resizing (reducing) processes are simultaneously performed and image data is output, a detailed description thereof will be omitted here.

In the imaging apparatus 21 illustrated in FIG. 8, each of the resizing processing unit 800 and the resizing processing unit 801 outputs image data subjected to the resizing (reducing) process according to a size of an image used in a process of a subsequent stage. Also, the output DMA unit 261 sequentially stores the respective image data input from the resizing processing unit 800 and the resizing processing unit 801 in the DRAM 501 through DMA. Accordingly, in the process of the subsequent stage, the process can be performed using image data having an optimal size.

Further, in the imaging apparatus 20 of the second embodiment, the resizing (reducing) process in the resizing processing unit 800 is set to OFF when image data used to generate the display image is not generated. More specifically, the resizing (reducing) process is set to OFF in procedures other than procedure 2 in the example of the operation illustrated in FIGS. 6A and 6B and procedure 3 in the example of the operation illustrated in FIGS. 7A, 7B and 7C. Accordingly, in the imaging apparatus 20 of the second embodiment, the image data when the captured images of the respective frames are synthesized by the synthesis unit 224 is image data not subjected to resizing (reducing). Accordingly, in the imaging apparatus 20 of the second embodiment, the captured image of each frame can be synthesized while maintaining image quality of the captured image according to the pixel signal input from the image sensor 100.

However, in the imaging apparatus 20 of the second embodiment, the squeeze of the bus band of the data bus 700 cannot be reduced in procedures other than procedure 2 in the example of the operation illustrated in FIGS. 6A and 6B or procedure 3 in the example of the operation illustrated in FIGS. 7A, 7B and 7C. Accordingly, in order to reduce the squeeze of the bus band of the data bus 700 even in the procedures other than procedure 2 in the example of the operation illustrated in FIG. 6 or procedure 3 in the example of the operation illustrated in FIGS. 7A, 7B and 7C, a resizing processing unit that performs a resizing (magnifying) process may be included, as illustrated in FIG. 9.

Second Modified Example of Second Embodiment

Figure 9:
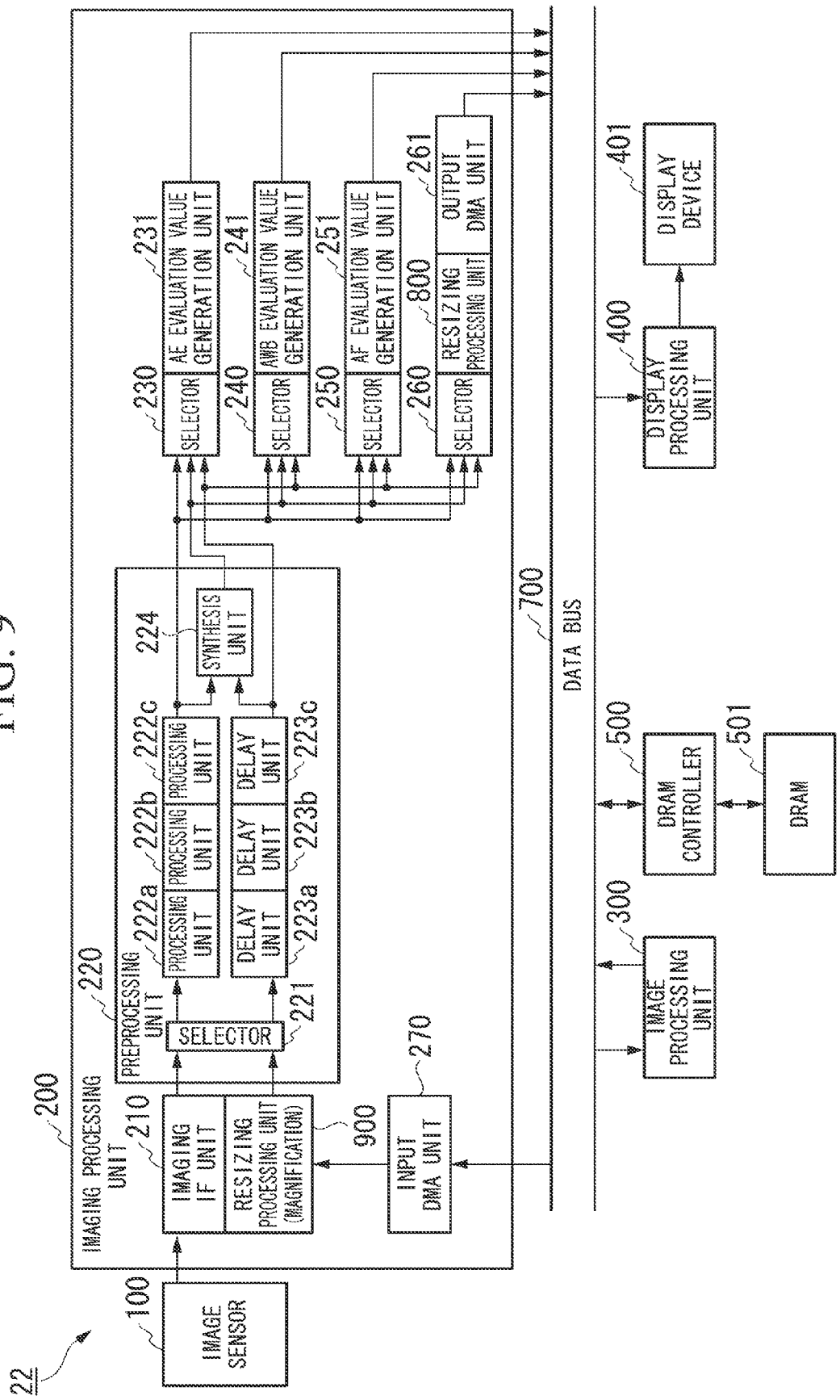
FIG. 9 is a block diagram illustrating still another schematic configuration of the imaging apparatus in the second embodiment.

FIG. 9 is a block diagram illustrating still another schematic configuration of the imaging apparatus 20 in the second embodiment. In the following description, an imaging apparatus illustrated in FIG. 9 is referred to as an imaging apparatus 22. The imaging apparatus 22 includes a resizing processing unit 900 added between the input DMA unit 270 and the selector 221 in the preprocessing unit 220 in the imaging processing unit 200 of the imaging apparatus 20 illustrated in FIG. 5. Other components are the same as those of the imaging apparatus 20 of the second embodiment. Accordingly, in a description of the imaging apparatus 22, only a configuration and an operation different from those of the imaging apparatus 20 of the second embodiment will be described and a detailed description thereof will be omitted here.

The input DMA unit 270 acquires (reads) the image data (the captured image of the previous frame) stored in the DRAM 501 via the DRAM controller 500 through DMA, and outputs the acquired image data to the resizing processing unit 900.

The resizing processing unit 900 resizes (magnifies) the image data input from the input DMA unit 270 to a size of an image of the image data (captured image) according to the pixel signal input from the image sensor 100, which is output by the imaging IF unit 210. Also, the resizing processing unit 900 outputs the resized (magnified) image data to the preprocessing unit 220. A method of a resizing (magnifying) process in the resizing processing unit 900 is, for example, the reverse of a resizing (reducing) process performed by the display processing unit 400, and thus a detailed description thereof will be omitted here.

The resizing processing unit 900 has a function of determining whether to perform the resizing (magnifying) process on the image data input from the input DMA unit 270, that is, setting the resizing (magnifying) process to ON or OFF. Switching ON or OFF of the resizing (magnifying) process in the resizing processing unit 900 is controlled by the CPU 600 in every procedure of operation of the evaluation value generation and the image display in the imaging apparatus 20.

The selector 221 selects an output destination of the image data input from the imaging IF unit 210 (a captured image of a current frame) and the image data input from the resizing processing unit 900 (a captured image of a previous frame). More specifically, the selector 221 outputs the image data input from the imaging IF unit 210 to any one of the processing unit 222a and the delay unit 223a. Further, the selector 221 outputs the image data input from the resizing processing unit 900 to any one of the processing unit 222a and the delay unit 223a.

Also, in the operation of the imaging apparatus 22, the resizing (reducing) process is set to ON and the resizing (magnifying) process in the resizing processing unit 900 is also set to ON, in a procedure in which the resizing (reducing) process in the resizing processing unit 800 has been set to OFF in the operation of the evaluation value generation and the image display in the imaging apparatus 20.

More specifically, for example, in the example of the operation illustrated in FIGS. 7A, 7B and 7C, the resizing (reducing) process in the resizing processing unit 800 is set to ON and the resizing (magnifying) process in the resizing processing unit 900 is also set to ON in both procedure 1 and procedure 2. Accordingly, the image size 261o1 illustrated in FIG. 7A (see procedure 1) and the image size 261o2 illustrated in FIG. 7B (see procedure 2), stored in the DRAM 501 by the output DMA unit 261, are equal to the image size 261oS illustrated in FIG. 7C (see procedure 3). Further, the image size 270i1 illustrated in FIG. 7B (see procedure 2) and the image size 270i2 illustrated in FIG. 7C (see procedure 3), which the input DMA unit 270 acquires (reads) from the DRAM 501, are equal to the image size 261oS illustrated in FIG. 7C (see procedure 3).

Accordingly, in the imaging apparatus 22 illustrated in FIG. 9, it is possible for the size of image data present on the data bus 700 at the same time to be the size of the image data after the resizing (reducing) process, even in the operation in which squeeze of the bus band of the data bus 700 cannot be reduced in the imaging apparatus 20. Thus, in the imaging apparatus 22 illustrated in FIG. 9, it is possible to reduce the squeeze of the bus band of the data bus 700 at all times. More specifically, even in procedures other than procedure 2 in the example of the operation illustrated in FIGS. 6A and 6B and procedure 3 in the example of the operation illustrated in FIGS. 7A, 7B and 7C, it is possible for the size of the image data present on the data bus 700 at the same time to be an image size 261oS illustrated in FIGS. 6B and 7C, and it is possible to reduce the squeeze of the bus band of the data bus 700.

As described above, in the embodiment of the present invention, the input DMA unit (the input DMA unit 270 in the present embodiment) that acquires (reads) the image data stored in the DRAM is provided within the imaging processing unit of the imaging apparatus. Further, the selectors (the selector 230, the selector 240, and the selector 250 in the present embodiment) that select the image data to be input to the corresponding evaluation value generation units are provided in preceding stages (image data input units) of the evaluation value generation units (the AE evaluation value generation unit 231, the AWB evaluation value generation unit 241, and the AF evaluation value generation unit 251 in the present embodiment) included in the imaging processing unit. Further, the synthesis unit (the synthesis unit 224 in the present embodiment) that synthesizes the image data of the current frame and the image data of the previous frame to generate the synthesis image data is provided in the preprocessing unit included in the imaging processing unit (the preprocessing unit 220 in the present embodiment).

Thus, according to the embodiment of the present invention, the pixel signal is acquired from the image sensor (the image sensor 100 in the present embodiment) and the frame rate of the image data (the imaging frame rate) for generation of the evaluation value increases. Accordingly, it is possible to realize an imaging apparatus capable of obtaining more evaluation values. Also, even in this case, it is possible to display the image on the display device at the frame rate (display frame rate) at which the display device (the display device 401 in the present embodiment) included in the imaging apparatus (the imaging apparatus 10 and the imaging apparatus 20 in the present embodiment) can display the image, without decimating the captured image of each frame obtained from the image sensor, that is, without reducing information of the image data.

Further, according to the embodiment of the present invention, the image data input to the evaluation value generation unit and used to generate the evaluation value can be switched to any one of image data input in real time, the image data stored in the DRAM, and image data obtained by synthesizing image data of respective frames. Accordingly, according to the embodiment of the present invention, it is possible to generate the respective evaluation values based on various image data using the same evaluation value generation unit (diverting the same evaluation value generation unit).

More specifically, for example, in the imaging apparatus 10 of the first embodiment, the CPU 600 controls the selector 221 to select image data to be sent to the processing units 222a to 222c and the delay units 223a to 223c. Further, the CPU 600 controls the selector 230, the selector 240, the selector 250, and the selector 260 to select image data to be input to the AE evaluation value generation unit 231, the AWB evaluation value generation unit 241, the AF evaluation value generation unit 251, and the output DMA unit 261. Accordingly, in the imaging apparatus 10 of the first embodiment, it is possible to switch the image data used to generate the evaluation value or the image data to be stored in the DRAM 501. That is, in the imaging apparatus 10 of the first embodiment, it is possible to generate the AE evaluation value, the AWB evaluation value, and the AF evaluation value based on the image data of the current frame according to the pixel signal output from the image sensor 100, the image data of the previous frame acquired (read) via the DRAM controller 500, or the image data obtained by synthesizing the image data of the current frame and the image data of the previous frame. Accordingly, it is possible to obtain the evaluation values for control of the AE, AWB, and AF for photography from appropriate image data at a necessary timing. For example, control requiring no high speed can be appropriately performed without unnecessarily increasing power consumption of the imaging apparatus 10, by obtaining the evaluation values at the display frame rate based on the synthesis image data.

Further, according to the embodiment of the present invention, the resizing processing unit (the resizing processing unit 800 in the present embodiment) that resizes (reduces) the image data is provided within the imaging processing unit. Accordingly, according to the embodiment of the present invention, when the captured image according to the pixel signal input from the image sensor is sequentially displayed on the display device, it is possible to reduce the squeeze of the bus band of the data bus. Thus, when the display processing unit generates the display image, it is possible to reduce the load of the process. Particularly, in the present embodiment, when the input DMA unit 270 acquires (reads) the captured image stored in the DRAM 501 and the output DMA unit 261 stores the synthesis image data in the DRAM 501, the image data of the captured image corresponding to two frames is present on the data bus 700 at the same time, but, as the sizes of the image data of the captured image corresponding to two frames present at the same time are reduced, it is possible to reduce the squeeze of the bus band of the data bus 700.

In the present embodiment, for example, in the imaging apparatus 10, the imaging IF unit 210 processes the captured image of the current frame and the captured image of the previous frame at the same timing. This is performed by the selector 221 and the delay units 223a to 223c provided in the preprocessing unit 220. Further, for example, a method by which the CPU 600 controls a timing at which the input DMA unit 270 acquires (reads) the captured image of the previous frame stored in the DRAM 501 is also considered as a method by which the imaging IF unit 210 simultaneously processes different image data, which has been acquired at different timings. However, it is not easy for the CPU 600 to perform control at the same timing as the captured image of the current frame input from the imaging IF unit 210 in real time. In the imaging apparatus 10, since the delay units 223a to 223c are provided in the preprocessing unit 220, it is possible for the timing of the captured image of the previous frame to be easily made the same as the timing of the captured image of the current frame acquired in real time.

More specifically, for example, in the imaging apparatus 10, the captured image of the current frame input from the imaging IF unit 210 in real time is sent to the processing unit 222a by the selector 221, and the captured image of the previous frame acquired previously by the imaging IF unit 210, input from the input DMA unit 270, is sent to the delay unit 223*a*. Also, the delay units 223*a* to 223*c* cause the captured image of the previous frame acquired previously by the imaging IF unit 210 to be at the same timing as the captured image of the current frame subjected to the preprocessing (correction process) by the processing units 222*a* to 222*c* in real time. That is, two image data to be subjected to the synthesis process at the same timing are input to the synthesis unit 224. Accordingly, the synthesis unit 224 can perform the synthesis process on the different image data acquired by the imaging IF unit 210 at different timings.

Further, in the present embodiment, the case in which the three delay units 223*a* to 223*c* corresponding to the processing units 222*a* to 222*c* included in the preprocessing unit 220 are provided and each of the delay units 223*a* to 223*c* delays the input image data by the same time as a delay time from an input of the corresponding one of the processing units 222*a* to 222*c* to an output thereof and outputs the delayed image data has been described. However, the configuration of the delay unit is not limited to the embodiment of the present invention. For example, only one delay unit that delays the input image data by the same time as a total delay time of the preprocessing (correction process) in the processing units 222*a* to 222*c* and outputs the delayed image data may be provided in place of the delay units 223*a* to 223*c*.

Further, in the present embodiment, the case in which the delay units 223*a* to 223*c* are provided within the preprocessing unit 220 has been described. However, an internal configuration of the preprocessing unit 220 is not limited to the embodiment of the present invention. For example, when an output timing of the image data acquired and output by the imaging IF unit 210 in real time and a timing at which the input DMA unit 270 acquires (reads) the image data stored in the DRAM 501 can be controlled to be the same timing, the delay units 223*a* to 223*c* may not be provided within the preprocessing unit 220. In this case, the selector 221 outputs the input image data to the synthesis unit 224 and each of the selector 230, the selector 240, the selector 250, and the selector 260, instead of sending the image data to the delay unit 223*a*. Accordingly, when the selector 221 outputs the image data to the selector 230, the selector 240, the selector 250, and the selector 260, it is possible to shorten a time from a time at which the selector 221 outputs the image data to a time at which each evaluation value generation unit ends the generation of the evaluation value.

Further, in the present embodiment, the case in which the delay units 223*a* to 223*c* that delay the input image data by the same time as the delay time from the input of each of the processing units 222*a* to 222*c* to the output thereof and output the delayed image data are provided in the preprocessing unit 220 has been described. However, the internal configuration of the preprocessing unit 220 is not limited to the embodiments of the present invention. For example, a set of processing units 222*a* to 222*c* may be further provided in place of the delay units 223*a* to 223*c*. In this case, the preprocessing (correction process) may be simultaneously performed on both the image data input in real time and the image data stored in the DRAM. In this case, circuit scale of the preprocessing unit increases. Such a configuration is considered to be useful in an imaging apparatus in which the preprocessing (correction process) is required to be simultaneously performed on different image data, irrespective of the increase in the circuit scale.

While the embodiments of the present invention have been described above with reference to the accompanying drawings, a concrete configuration is not limited to the embodiments and includes various changes without departing from the scope and spirit of the present invention.

While the preferred embodiments of the present invention have been described above, the present invention is not limited to the embodiments. Additions, omissions, and substitutions, and other variations of the configuration may be made to the present invention without departing from the scope and spirit of the present invention. The present invention is not limited by the above-described description, but only by the appended claims.

What is claimed is:
1. An imaging apparatus comprising:
an image data interface unit that outputs image data according to a pixel signal input from a solid-state imaging device as first image data, the pixel signal having a first frame rate;
an image data reading unit that reads image data stored in a storage unit via a data bus and outputs the read image data as second image data;
an image synthesis unit that synthesizes image data based on the first image data with image data based on the second image data to generate and output third image data having a second frame rate;
an evaluation value generation unit that generates an evaluation value based on input image data, the evaluation value having the first frame rate;
a first image data selection unit that selects any one of the image data based on the first image data, the image data based on the second image data, and the third image data as image data to be input to the evaluation value generation unit;
an image data writing unit that stores input image data in the storage unit via the data bus;
a second image data selection unit that selects any one of the image data based on the first image data, the image data based on the second image data, and the third image data as image data to be input to the image data writing unit; and
a display unit that reads the third image data stored in the storage unit by the image data writing unit, from the storage unit via the data bus and displays an image according to the third read image data, wherein
the first frame rate is higher than the second frame rate.
2. The imaging apparatus according to claim 1, wherein:
the image data interface unit sequentially outputs a plurality of first image data according to the pixel signal input from the solid-state imaging device in an unit period in which the display unit updates display of the image;
the second image data selection unit selects the image data based on the first image data first output from the image data interface unit after the unit period of the display unit starts, as the image data to be input to the image data writing unit, and then selects the sequentially input third image data as the image data to be input to the image data writing unit until the unit period of the display unit ends;
the image data writing unit sequentially stores the third input image data subsequently to the first input image data based on the first image data in the storage unit;
the image data reading unit sequentially reads, as second image data, the third image data stored in the storage unit subsequently to the first image data based on the first image data stored in the storage unit;
the image synthesis unit sequentially outputs the third image data obtained by sequentially synthesizing the image data based on the first image data sequentially output from the image data interface unit with the image data based on the second image data read by the image data reading unit;

the display unit displays an image according to the third image data lastly synthesized by the image synthesis unit, which is stored in the storage unit, when the unit period of the display unit ends;

the first image data selection unit sequentially selects, in the unit period of the display unit, any one of the image data based on the first image data sequentially output from the image data interface unit, the image data based on the second image data sequentially read by the image data reading unit, and the third image data sequentially synthesized by the image synthesis unit, as the image data to be input to the evaluation value generation unit; and the evaluation value generation unit sequentially generates the evaluation value based on the sequentially input image data.

3. The imaging apparatus according to claim 2, further comprising an image reduction unit that is arranged between the second image data selection unit and the image data writing unit, reduces the image data selected by the second image data selection unit to a predetermined size, and outputs the reduced image data as the image data to be input to the image data writing unit.

4. The imaging apparatus according to claim 3, wherein the image reduction unit reduces only image data to be lastly input to the image data writing unit to output the reduced image data to the image data writing unit in the unit period of the display unit.

5. The imaging apparatus according to claim 2, further comprising
a plurality of image reduction units that are arranged between the second image data selection unit and the image data writing unit, reduce the image data selected by the second image data selection unit to a predetermined size, and output the reduced image data as the image data to be input to the image data writing unit,
wherein: the respective image reduction units reduce the image data selected by the second image data selection unit to predetermined different sizes, and output the respective reduced image data as respective image data to be input to the image data writing unit; and
the image data writing unit sequentially stores the respective reduced image data input from the respective image reduction units in the storage unit.

6. The imaging apparatus according to claim 5, wherein the respective image reduction units reduce only image data to be lastly input to the image data writing unit to output the reduced image data to the image data writing unit in the unit period of the display unit.

7. The imaging apparatus according to claim 2, further comprising:
an image reduction unit that is arranged between the second image data selection unit and the image data writing unit, reduces the image data selected by the second image data selection unit to a predetermined size, and outputs the reduced image data as the image data to be input to the image data writing unit; and
an image magnification unit that is arranged in a subsequent stage of the image data reading unit, magnifies the second image data read by the image data reading unit to the same size as the first image data output by the image data interface unit, and outputs the magnified image data as the second image data.

8. The imaging apparatus according to claim 7, wherein:
the image reduction unit reduces all image data to be input to the image data writing unit to output the reduced image data to the image data writing unit in the unit period of the display unit; and
the image magnification unit magnifies all the second image data read by the image data reading unit to output the magnified image data as the second image data in the unit period of the display unit.

9. The imaging apparatus according to claim 2, further comprising:
a first preprocessing unit that performs a predetermined process on input image data; and
a second preprocessing unit that performs a predetermined process on input image data,
wherein the first preprocessing unit outputs image data obtained by performing the predetermined process on any one of the first input image data and the second input image data, as fourth image data,
the second preprocessing unit outputs image data obtained by performing the predetermined process on the other of the first input image data and the second input image data, as fifth image data,
the first image data selection unit selects any one of the third image data, the fourth image data and the fifth image data, as the image data to be input to the evaluation value generation unit, and
the second image data selection unit selects any one of the third image data, the fourth image data and the fifth image data, as the image data to be input to the image data writing unit.

10. The imaging apparatus according to claim 9, wherein:
the first preprocessing unit is at least one processing unit that performs a predetermined correction process on input image data; and
the second preprocessing unit is at least one delay unit that performs a process of delaying input image data by a predetermined time and outputting the delayed image data.

11. The imaging apparatus according to claim 10, wherein the predetermined time is the same time as a delay time from a time when the image data is input to the first preprocessing unit to a time when the image data is subjected to the predetermined correction process and output.

12. The imaging apparatus according to claim 9, wherein:
the first preprocessing unit is at least one first processing unit that performs a predetermined correction process on the input image data; and
the second preprocessing unit is at least one second processing unit that performs a predetermined correction process on the input image data.

13. The imaging apparatus according to claim 11, wherein:
when the evaluation value generation unit generates the evaluation value based on the image data according to the pixel signal input from the solid-state imaging device, the first image data selection unit selects any one of the fourth image data and the fifth image data based on the first image data, as the image data to be input to the evaluation value generation unit;
when the evaluation value generation unit generates the evaluation value based on the image data stored in the storage unit, the first image data selection unit selects any one of the fourth image data and the fifth image data based on the second image data, as the image data to be input to the evaluation value generation unit; and
when the evaluation value generation unit generates the evaluation value based on the third image data, the first image data selection unit selects the third image data as the image data to be input to the evaluation value generation unit.

14. The imaging apparatus according to claim 13, wherein: the imaging apparatus includes:
a plurality of evaluation value generation units; and
a plurality of first image data selection units corresponding to the plurality of evaluation value generation units, respectively,
wherein each first image data selection unit selects any one of the third image data, the fourth image data based on any one of the first image data and the second image data, and the fifth image data based on any one of the first image data and the second image data, which is used when the corresponding evaluation value generation unit generates the evaluation value, as image data to be input to the corresponding evaluation value generation unit.

15. The imaging apparatus according to claim 14, wherein:
at least one first image data selection unit selects any one of the fourth image data and the fifth image data based on any one of the first image data and the second image data, which is used when the corresponding evaluation value generation unit generates the evaluation value, as image data to be input to the corresponding evaluation value generation unit, and
at least the other first image data selection unit selects the third image data or the other of the fourth image data and the fifth image data based on the other of the first image data and the second image data, which is used when the corresponding evaluation value generation unit generates the evaluation value, as the image data to be input to the corresponding evaluation value generation unit.

* * * * *